(12) United States Patent
Li

(10) Patent No.: US 9,529,490 B2
(45) Date of Patent: Dec. 27, 2016

(54) METHOD AND APPARATUS FOR IMPROVING ONE-HANDED OPERATION OF A LARGE SMARTPHONE OR A SMALL TABLET COMPUTER

(71) Applicant: Eric Qing Li, Dallas, TX (US)

(72) Inventor: Eric Qing Li, Dallas, TX (US)

( * ) Notice: Subject to any disclaimer, the term of this patent is extended or adjusted under 35 U.S.C. 154(b) by 159 days.

(21) Appl. No.: 13/962,031

(22) Filed: Aug. 8, 2013

(65) Prior Publication Data

US 2015/0046825 A1    Feb. 12, 2015

(51) Int. Cl.
*G06F 3/0481* (2013.01)
*G06F 3/0484* (2013.01)
*G06F 3/14* (2006.01)
*G06F 3/16* (2006.01)

(52) U.S. Cl.
CPC .......... *G06F 3/0481* (2013.01); *G06F 3/04845* (2013.01); *G06F 3/14* (2013.01); *G06F 3/167* (2013.01); *G06F 2203/04806* (2013.01); *G09G 2340/045* (2013.01); *G09G 2340/0492* (2013.01); *G09G 2354/00* (2013.01)

(58) Field of Classification Search
CPC .......... G06F 3/0481; G06F 3/16; G06F 3/017; G06F 3/0346; G06F 3/1626; G06F 3/0484; G06F 3/04886; G06F 1/3234; H04M 1/0281; H04M 2/25; H04M 2/12; H04N 1/00307; H04N 1/00413
USPC ........ 715/728, 800, 810; 345/661, 158, 173, 345/156
See application file for complete search history.

(56) References Cited

U.S. PATENT DOCUMENTS

| | | | |
|---|---|---|---|
| 2004/0142720 A1* | 7/2004 | Smethers | 455/550.1 |
| 2006/0277491 A1* | 12/2006 | Kaneko | G09G 5/14 715/788 |
| 2009/0119616 A1* | 5/2009 | Chalemin et al. | 715/788 |
| 2010/0234074 A1* | 9/2010 | Keski-Jaskari | G06F 3/0233 455/566 |
| 2013/0055077 A1* | 2/2013 | Hagel-Sorensen | G06F 17/212 715/273 |
| 2014/0189583 A1* | 7/2014 | Yang | 715/800 |
| 2014/0362119 A1* | 12/2014 | Freund et al. | 345/661 |

OTHER PUBLICATIONS

TheBitTv, "HP TouchPad Web OS Tour and Review", Jul. 7, 2011, <URL: https://youtu.be/W8hY136D8eM/>, p. 1-8.*

* cited by examiner

*Primary Examiner* — Ajay Bhatia
*Assistant Examiner* — Mong-Shune Chung

(57) ABSTRACT

The present disclosure involves a method of improving one-handed operation of a mobile computing device. A first visual content is displayed on a screen of the mobile computing device. The first visual content occupies a substantial entirety of a viewable area of the screen. While the first visual content is being displayed, an action performed by a user to the mobile computing device is detected. The first visual content is scaled down in response to the detected action and displayed on the screen. The scaled-down first visual content occupies a fraction of the viewable area of the screen. A user interaction with the scaled-down first visual content is then detected. In response to the user interaction, a second visual content is displayed on the screen. The second visual content is different from the first visual content and occupies a substantial entirety of the viewable area of the screen.

20 Claims, 23 Drawing Sheets

METHOD AND APPARATUS FOR IMPROVING ONE-HANDED OPERATION OF A LARGE SMARTPHONE OR A SMALL TABLET COMPUTER

BACKGROUND

Technical Field

The present disclosure generally relates to improving the one-handed operation of a large smartphone or a small tablet computer.

Related Art

In recent years, the rapid advances in computer technology and broadband telecommunications have enhanced the popularity of mobile computing devices such as smartphones and tablet computers. Among other things, these mobile computing devices can be used to browse the web, play games, music, or videos, take pictures, send/receive emails, etc. However, existing mobile computing devices may still have various drawbacks that limit their usability or versatility. One of such drawbacks relates to one-handed operation of these devices. In more detail, a recent trend is the increasing screen sizes of these mobile computing devices. As the screen sizes become larger and larger, one-handed operation with these large-screen devices becomes problematic, and sometimes near impossible, even for users with large hands. The lack of one-handed operability of large-screen mobile computing devices may lead to a frustrating user experience.

Therefore, while existing mobile computing devices have been generally adequate for their intended purposes, they have not been entirely satisfactory in every aspect.

DETAILED DESCRIPTION

Figure 1:
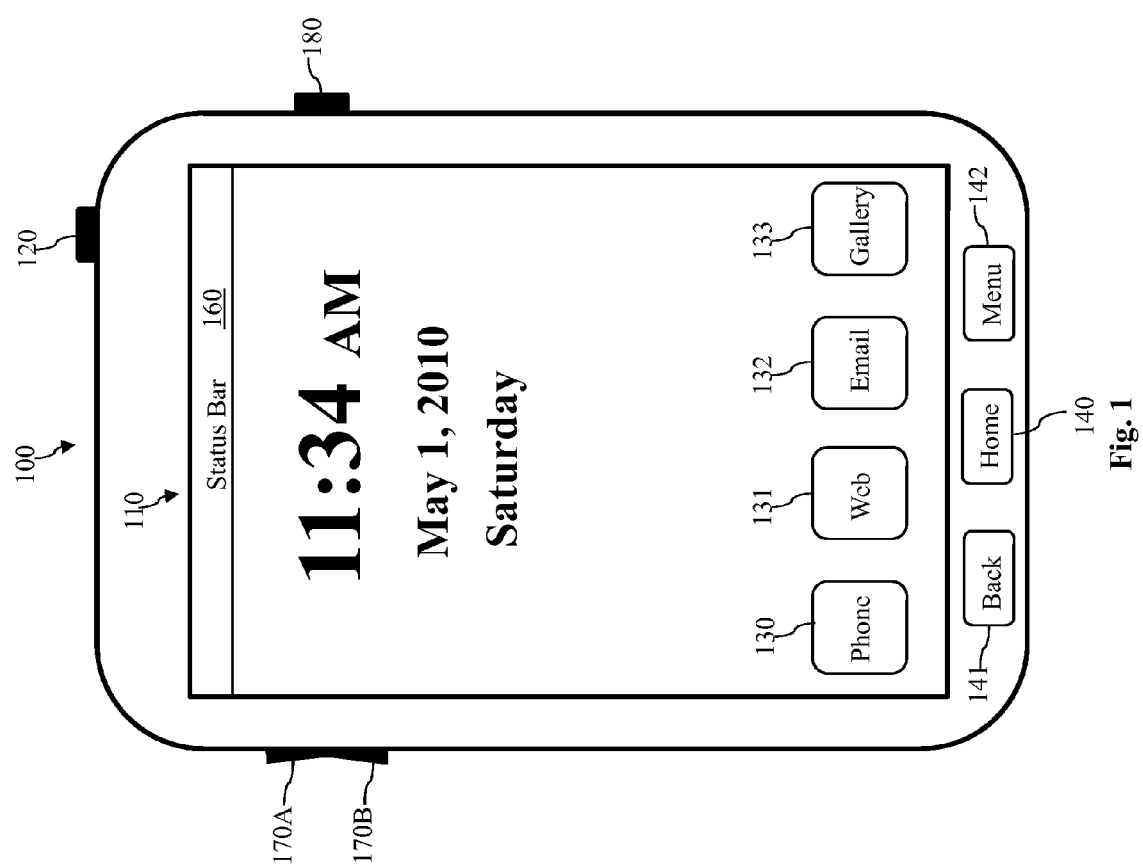
FIGS. 1-20 are diagrammatic views of an example mobile computing device for performing a visual content scaling down process according to various aspects of the present disclosure.

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity. In addition, the present disclosure may repeat reference numerals and/or letters in the various examples. This repetition is for the purpose of simplicity and clarity and does not in itself dictate a relationship between the various embodiments and/or configurations discussed.

As used herein, the term "about" refers to a +/−5% variation from the nominal value. As used herein, the term "and/or" includes any and all combinations of one or more of the associated listed items. As used herein, the singular forms "a", "an", and "the" are intended to include the plurality forms as well, unless the context clearly and specifically indicates otherwise. In addition, unless defined otherwise, all technical and scientific terms used herein have the same meaning as commonly understood by one of ordinary skill in the art to which this disclosure belongs.

In recent years, the rapid advances in computer technology and broadband telecommunications have led to the growing popularity of mobile computing devices such as tablet computers and mobile telephones. A user can perform a plurality of tasks on these mobile computing devices, for example tasks that previously required a powerful conventional desktop or laptop computer. Among other things, a user can play movies/videos, browse the web, play games, view photographs, listen to digital music, read e-books, receive navigational instructions, send and receive emails, conduct audio or video telephone calls, perform word processing/spreadsheet calculation/presentation management tasks, or take advantage of additional functionalities offered by applications (apps) that can be downloaded from online app stores.

However, the mobile computing devices may still have certain drawbacks that limit their versatility and usability, particularly with respect to one-handed use. In more detail, the screen size of smartphones (an example type of mobile computing device) has been steadily increasing over the years. Recently, many manufacturers have been releasing smartphones with screen sizes that are anywhere from 4.3 inches to 6 inches. While the larger screen sizes offer more viewing real estate for the users, one-handed use becomes more difficult. For example, a user with average-sized hands may comfortably reach all four corners of a smartphone screen smaller than 3.5 inches (e.g., measured diagonally) with his/her thumb while holding the phone one-handed. This task becomes more challenging as the screen size reaches 4-4.7 inches. At 4.7-5.5 inches, many users experience great difficulty in reaching all four corners of the screen with the thumb of a single hand. When the smartphone screen is greater than 5.5 inches, even users with large hands may find it impossible to reach all areas of the screen with just a single hand. The one-handed use difficulty also applies to small tablet computers (another example type of mobile computing device) with screen sizes from about 6 inches to about 8 inches. While the user may still perform the necessary tasks by using both hands, the incompatibility (or lack of user-friendliness) with one-handed operation of these large smartphones/small tablet computers may prove frustrating to their users.

To overcome the problems discussed above, the present disclosure offers various solutions to enable or facilitate one-handed use or operation of large smartphones or small tablet computers, as discussed in more detail below.

Referring to FIG. 1, a simplified diagrammatic view of an example mobile computing device 100 is illustrated. In some embodiments, the mobile computing device 100 may be a smartphone (for example, APPLE's® IPHONE®, an ANDROID® phone, a WINDOWS® phone, or a BLACKBERRY®), a tablet computer (for example, APPLE's® IPAD®, an ANDROID® tablet, a WINDOWS® powered tablet, or a BLACKBERRY® tablet), or a laptop-tablet hybrid.

In some embodiments, the mobile computing device 100 may include a screen 110 for displaying visual information. The screen 110 may be touch-sensitive. A user may interactively engage with objects shown on the screen 110 by touching the objects with a finger, a stylus, or by hovering over the object. In some embodiments, the user may engage with the objects shown on the screen 110 even while wearing gloves or other clothing. The mobile computing device 100 may include a power button 120 that can be pressed to activate the screen 110.

Figure 11:
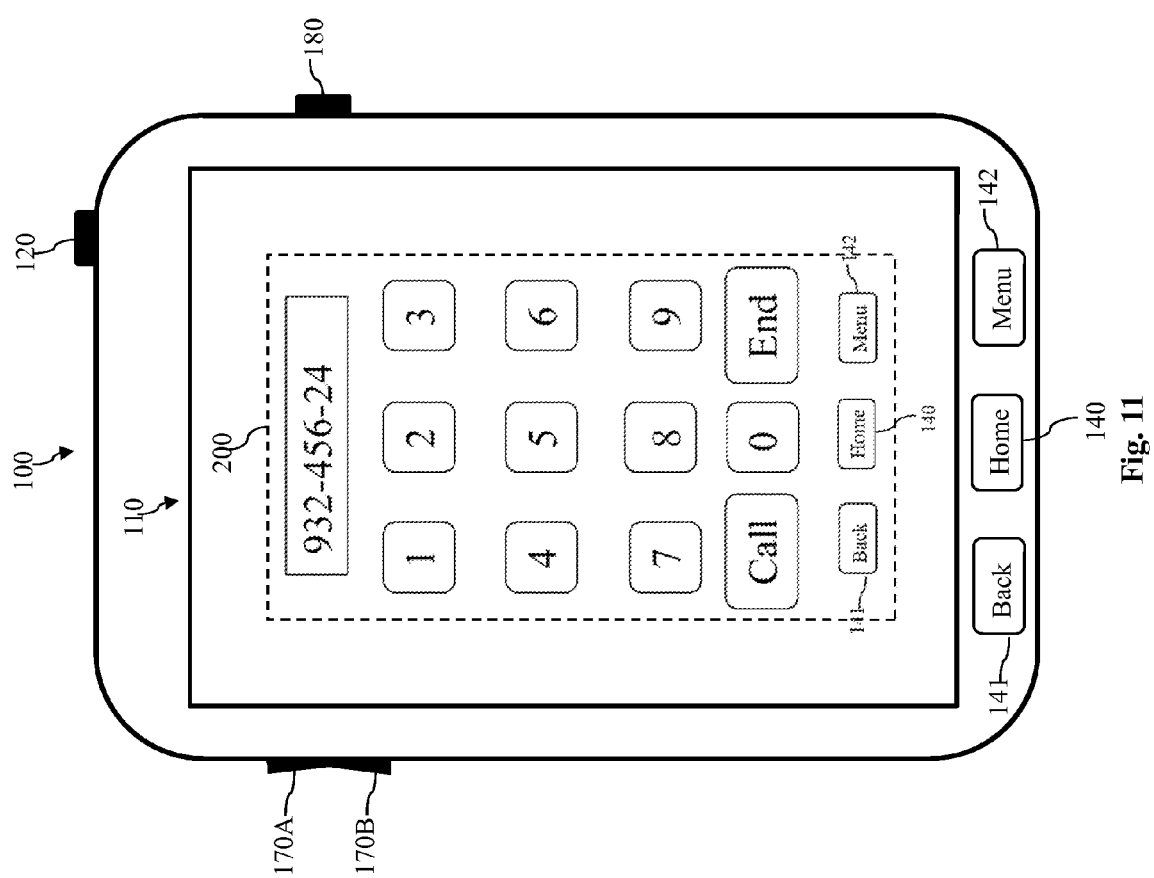

Visual content may be displayed on the screen 110 once the screen 110 is activated. For example, a lock screen is displayed on the screen 110 in FIG. 1 as an example of the visual content. In the illustrated embodiment, the lock screen may contain information such as time of the day, the day of the week, and the date. The lock screen may also contain a plurality of icons, some examples of which are illustrated in FIG. 11 as icons 130-133. These icons 130-133 each represent a different application that can be run on the mobile computing device 100. Stated differently, each application includes a task that is executable by the mobile computing device 100.

In the embodiment illustrated in FIG. 1, these icons 130-133 correspond to "Phone", "Web", "Email", and "Gallery", respectively. A user may perform a predefined engagement action with one of the icons 130-133, such as clicking on the icon or dragging it across a portion of the lock screen to launch the application associated with the icon. It is understood that the lock screen illustrated in FIG. 1 is merely an example and may contain different visual objects in other embodiments.

In some other embodiments, the visual content displayed on the screen 110 may be a home screen or an application drawer, which may each contain a plurality of icons that each represent an application or program. In yet other embodiments, the visual content displayed on the screen 110 may be the content of any of the applications/programs. For example, the visual content may be an electronic photograph, an electronic game, an electronic video, an electronic book, an email client, a web page, a phone dialer, a contacts list, a camera, a note pad, etc.

The mobile computing device 100 may also include one or more navigation buttons. In the embodiment shown in FIG. 1, the navigation buttons include a "home button" 140, a "back" button 141, and a menu button 142. Each button may be engaged by the user to perform a certain task. For example, the home button 140 may be pressed to return to a home screen, or to activate the screen 110 of the mobile computing device 100 if the screen was previously in an "off" state. The back button 141 may be pressed to perform one of the following actions: return to a previous web page; return to a previous application; return to a previous screen; dismiss a pop-up (or another notification); exit out of an application (such as a virtual keyboard); or terminate a running process. The menu button 142 may be performed to invoke a virtual menu for any application or program, from which the user may configure any particular setting. In yet other embodiments, a longer-than-normal press of any of the navigation buttons 140-142 may invoke other actions. For example, a long press of the home button 140 may trigger a virtual voice-based assistant, or a long press of the menu button 142 may trigger the display of a plurality of recently-run tasks or currently-running tasks.

The navigation buttons 140-142 are physical buttons in the embodiment shown in FIG. 1. For example, they may each correspond to a physical key that can be pressed into the mobile computing device 100. As another example of the physical buttons, the navigation buttons 140-142 may also be capacitive buttons that respond to a user's touch (either with a finger or a stylus).

In yet other embodiments, the mobile computing device 100 does not include physical navigation buttons, and instead may include virtual buttons (also referred to as soft buttons). The virtual buttons do not have fixed location on the mobile computing device 100 but may be displayed as a part of the visual content on the screen 110. The virtual buttons may also change their display locations depending on whether the mobile computing device 100 is in a portrait mode of orientation or a landscape mode of orientation.

Although not illustrated, additional navigation buttons may be implemented in certain embodiments, such as a multitasking button that allows a list of currently-running programs/applications to be displayed, or a search button that allows the user to immediately trigger a search box. Alternatively, a single navigation button (such as the home button) may be sufficient in other embodiments. In that case, the functionalities associated with the other navigation buttons may be integrated into the particular applications running on the mobile computing device 100.

The mobile computing device 100 may also include a status bar 160, which is typically displayed at the top of the screen 110 in most embodiments, but may be displayed in other suitable regions of the screen 110 in alternative embodiments. The status bar 160 may include a plurality of status notification icons or symbols that offer the user information, for example the arrival of a new email or text message, a missed phone call, an active connection to a wireless network, a connection quality to a network, an active GPS signal, a battery percentage, a current time of the day, etc. In some embodiments, the user may interactively engage with one or more of these icons in the status bar 160 to trigger a function, for example to launch an application. In certain embodiments, the user may also "swipe" down the status bar 160 to trigger the display of a "drop-down" menu on the screen 110. The drop-down menu may contain more detailed information or notifications, or even settings (e.g., screen brightness) of the mobile computing device 100 that can be quickly configured. For reasons of simplicity, the icons or symbols of the status bar 160 are not individually illustrated herein.

The mobile computing device 100 may also include one or more mechanisms for controlling its volume output. For example, a volume rocker 170 may be implemented on a side of the mobile computing device 100. A "volume up" rocker portion 170A may be pressed to increase the volume, and a "volume down" rocker portion 170B may be pressed to decrease the volume. Of course, the volume up and volume down portions may also be implemented as separate buttons in some embodiments, rather than a single rocker 170.

As discussed above, as the size of the screen 110 becomes bigger, one-handed operation becomes more difficult. To illustrate, suppose a diagonal size of the screen 110 of the mobile computing device 100 is around 5.5 inches. Now suppose the user wishes to press the icon 130, which is located near a bottom left corner of the mobile computing device 100, the user may have great difficulty performing this task with just one hand, especially if the user is holding the mobile computing device with the right hand. For example, it may be very hard for the user to reach the icon 130 with the thumb of the right hand that is holding the mobile computing device 100, as the icon 130 is located on the bottom left corner. Therefore, the user may have to use the other (left0 hand to press the icon 130, which may not always be convenient, as that other hand may already be occupied (e.g., it may be holding an object already). Alternatively, the user may still attempt to perform the abovementioned task one-handedly by moving/shifting the mobile computing device 100 relative to the hand that is holding it. Unfortunately, this is not only a time-consuming process, but it may also be precarious, since the user may drop the phone during the process and break it.

According to various aspects of the present disclosure, the user may perform a certain action to "shrink" or scale down the visual content displayed on the screen, such that the scaled-down visual content is compatible with one-handed operations. For example, in some embodiments, the mobile computing device 100 may include a dedicated physical button 180, which is located on a side of the mobile computing device 100 in the embodiment shown in FIG. 1 but may be implemented elsewhere on the mobile computing device 100 in other embodiments. If the user wishes to perform a one-handed operation, he/she may press the button 180 to trigger the shrinking or scaling down of the visual content currently displayed on the screen 110.

Figure 2:
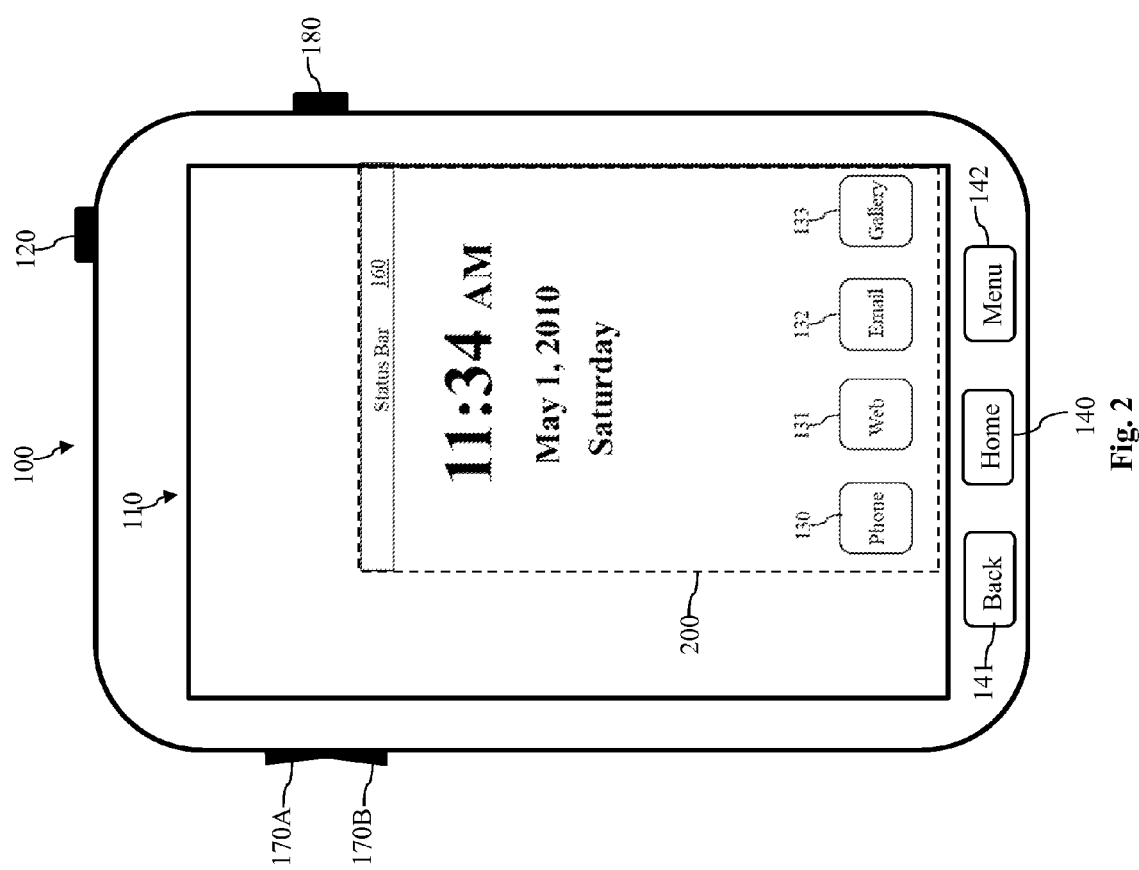

For example, referring to FIG. 2, the scaled-down visual content is displayed on the screen 110 upon the press of the button 180. Boundaries 200 of the scaled-down visual content are designated by dotted-lines in FIG. 2. The boundaries 200 of the scaled-down visual content confine the visual content (which used to taking up a substantial entirety of the screen 110) previously displayed on the screen 110 before the button 180 is pressed. However, the scaled-down visual content is at a reduced scaling factor with respect to the original visual content displayed in FIG. 1. For example, all the objects of the visual content may be scaled down by a predetermined factor/percentage, which may be 20%, or 30%, or 50%, or any other suitable number. In other words, the visual content defined by the boundaries 200 as shown in FIG. 2 may be a fraction (less than 1) of the size of the original visual content defined by the size of the screen 110, but otherwise resembles the original visual content displayed on the screen in FIG. 1. It is understood that in some embodiments, the scaled-down visual content displayed on the screen 110 in FIG. 2 need not mirror the original visual content displayed on the screen 110 in FIG. 1 exactly. Some objects of the visual content may be resized differently than other objects during this scaling down process. But regardless, the scaled-down visual content defined by the boundaries 200 now take up only a portion of the screen 110.

In some embodiments, the boundaries 200 may be clearly illustrated as solid or dotted lines. In other embodiments, the boundaries 200 may not appear very visible to the user. The regions of the screen 110 outside the boundaries 200 may be blank, or may be some type of wallpaper or screen saver, or may even contain other status updates or notifications in various embodiments.

As the visual content is now scaled-down, the user may reach the icon 130 more easily with just one hand, since the user's thumb need not travel as far as it used to in order to reach the icon 130. In the illustrated embodiment, the scale-down visual content is displayed in a region of the screen 110 near the thumb of the user's hand. The mobile computing device 100 may estimate a location of the user's thumb (relative to the screen 110) in several ways. In one embodiment, the user may be prompted to specify whether he/she prefers to hold the mobile computing device 100 left-handed or right-handed during an initial setup or configuration of the mobile computing device 100. If the user specifies that he/she prefers to hold the mobile computing device 100 with the left hand, then the thumb will likely come from the left side of the screen 110, and therefore the mobile computing device 100 will configure the scaled-down visual content to be displayed proximate to the left side of the screen 110. On the other hand, if the user specifies that he/she prefers to hold the mobile computing device 100 with the right hand, then the thumb will likely come from the right side of the screen 110, and therefore the mobile computing device 100 will configure the scaled-down visual content to be displayed proximate to the right side of the screen 110 (as is shown in the embodiment of FIG. 2).

In some other embodiments, the user may not necessarily need to specify which hand is the preferred hand for holding the mobile computing device 100. Instead, the mobile computing device 100 may be able to detect which hand of the user is holding the mobile computing device 100 via one or more sensors. In some embodiments, one or more proximity sensors may be deployed in various regions of the mobile computing device 100, including underneath the screen 110. If the user is using the right hand to hold the mobile computing device 100, this may be detected by the proximity sensors. For instance, one or more proximity sensors may be deployed near the left and right edges of the screen 110. If the user is holding the mobile computing device 100 with the right hand and therefore uses the right thumb to make various engagements with the objects on the screen 110, the proximity sensors on the right edge of the mobile computing device 100 will detect such activity, whereas the proximity sensors on the left edge of the mobile computing device 100 may detect little to no user activity. Based on the activities detected by the proximity sensors, the mobile computing device 100 may determine that the user is holding the mobile computing device 100 with the right hand, and consequently display the scaled-down visual content closer to the right side of the screen 110 than the left. Similarly, the scaled-down visual content may be displayed closer to the left side of the screen 110 if the mobile computing device 100 determines (based on the proximity sensors) that the user is using the left hand to hold the mobile computing device 100.

In the example above, the proximity sensors may also be used to further estimate not just the left/right hand that is holding the mobile computing device 100, but also a more precise location of the user's thumb relative to the screen 110. For example, if proximity sensors are deployed in multiple places along each of the left edge and the right edge of the screen 110, then these sensors may be able to detect where the thumb is "crossing" the left or right edge of the screen. For example, if the user is holding the mobile computing device 100 in a manner such that mostly a bottom portion of the mobile computing device 100 is held in the user's hand, then the thumb used to engage with the screen 110 may be "crossing" the left edge or the right edge of the screen 110 closer to the bottom half of the screen 110, which may be detected by proximity sensors located near the bottom portions of the screen 110. In that case, the mobile computing device 100 may display the scaled-down visual content near or at the bottom of the screen 110 (regardless of whether it's the left side or the right side). Similarly, based on the sensors, the mobile computing device 100 may detect that the user is holding mostly the middle portion or the top portion of the mobile computing device 100, and consequently display the scaled-down visual content near the middle or the top of a particular edge of the screen 110, respectively. In other words, the scaled-down visual content may be displayed in a bottom left corner of the screen 110, a bottom right corner of the screen 110, a middle left corner of the screen 110, a middle right corner of the screen 110, a top left corner of the screen 110, and a top right corner of the screen 110. Of course, these six predefined display locations for the scaled-down visual content are merely examples, and the scaled-down visual content may be displayed in more (or less) than these six locations in other embodiments.

In some other embodiments, the mobile computing device 100 may have pressure sensors and/or motion sensors implemented therein, which may be used in conjunction with, or in addition to, the proximity sensors to further estimate the hand that is holding the mobile computing device 100 and/or the location of the user's thumb relative to the screen 110. For example, depending on whether the user is holding the mobile computing device 100 with the left hand or the right hand, different amounts of pressure may be applied to the left side of the mobile computing device 100 or the right side of the mobile computing device 100. Based on that data, the mobile computing device 100 may estimate the hand of the user that is holding the mobile computing device 100 (and therefore the direction from which the thumb is coming).

Figure 3:
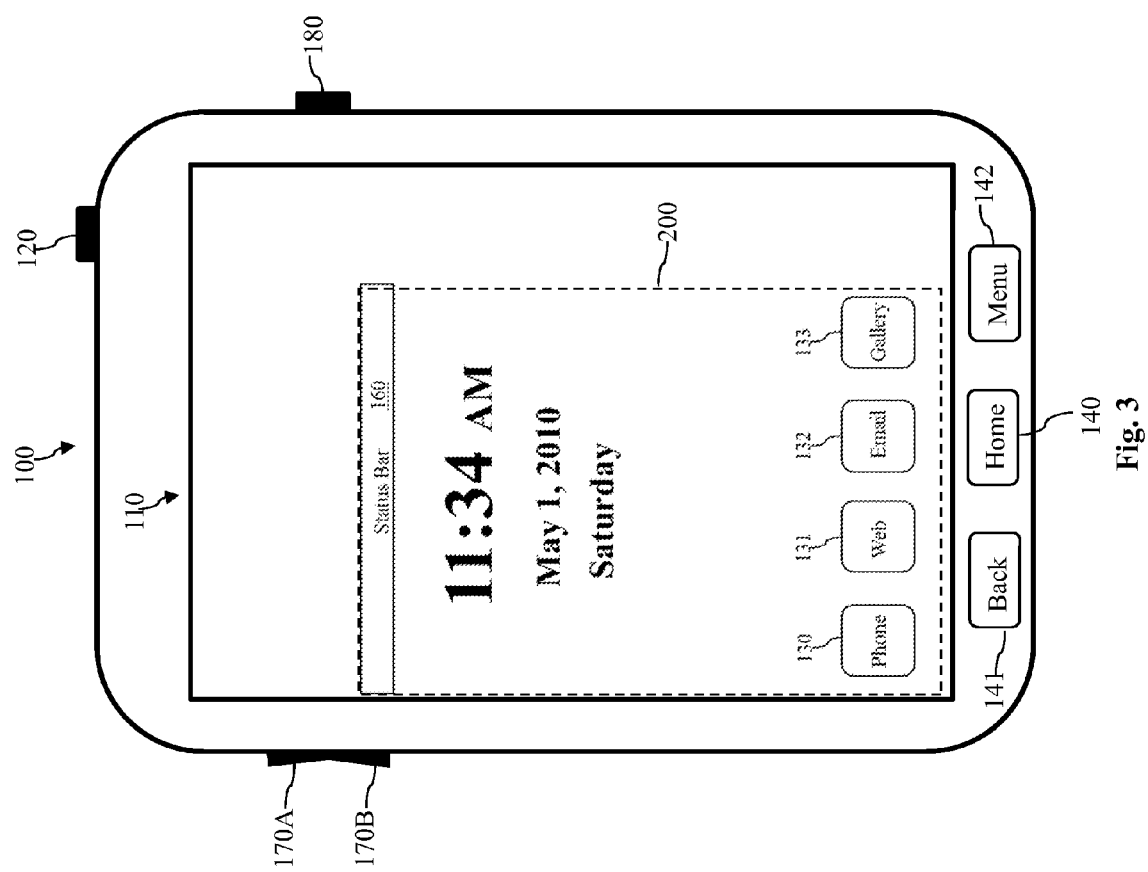

In some embodiments, in case the scaled-down visual content is incorrectly displayed at a region of the screen 110 not preferred by the user, the user may perform another action to quickly switch the region on the screen 110 at which the scaled-down visual content is displayed. For example, the user may wish to have the scaled-down visual content displayed near the bottom left corner of the screen 110, rather than the bottom right corner, as is the case in FIG. 2. The user may then press the button 180 again to switch the display location of the scaled-down visual content, for example to the bottom left corner of the screen 110 as shown in FIG. 3. In some embodiments, the user may press the button 180 to toggle the display of the scaled-down visual content to various locations, for example the bottom right corner, the bottom left corner, the top right corner, and the top left corner, etc. It is understood that the pressing of the button 180 is merely one way to switch the display location of the scaled-down visual content. In other embodiments, the user may shake the mobile computing device 100, or twist it, or flip it, in order to toggle the display location of the scaled-down visual content on the screen 110.

Figure 4:
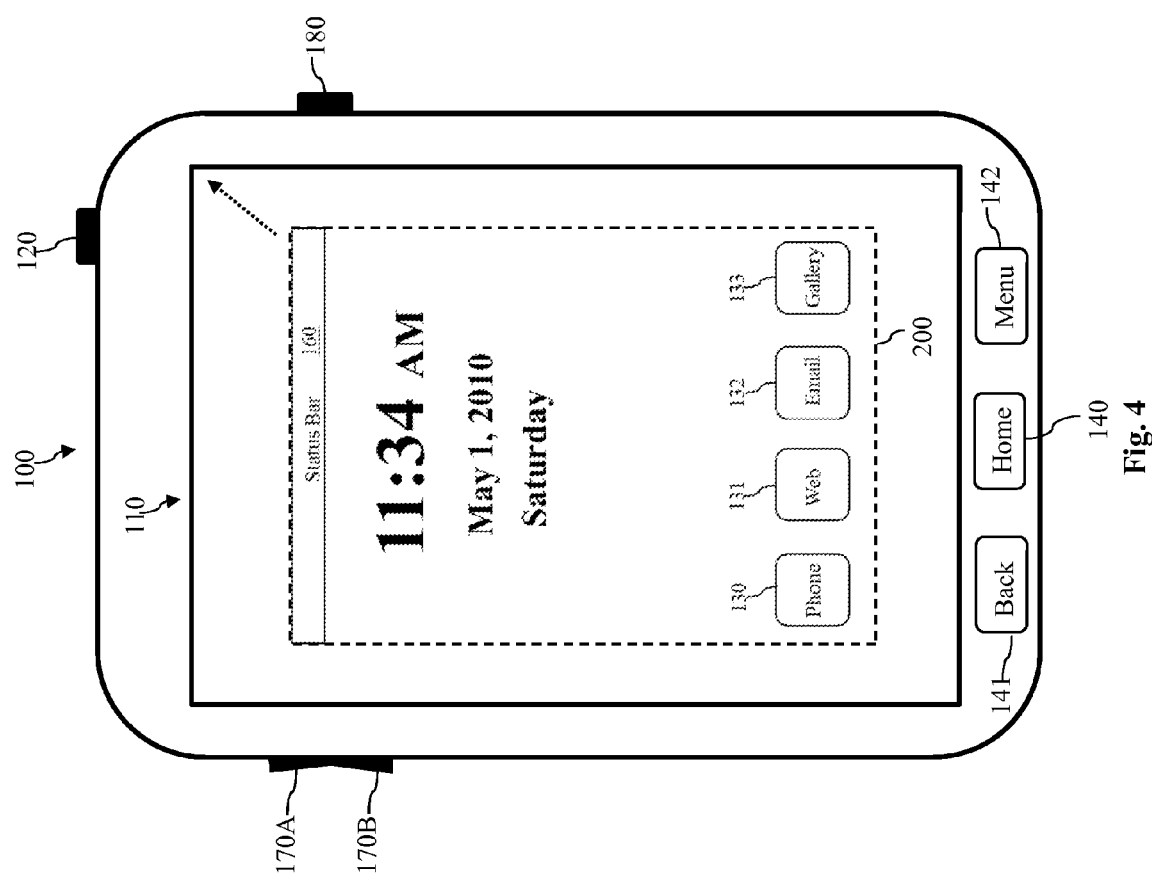

The present disclosure also allows the user to adjust the location of the scaled-down visual content by interacting with the mobile computing device 100. Referring to FIG. 4, the initial or default location of the scaled-down visual content may appear at or near a center (or at any other part) of the screen 110. This location may or may not be the user-preferred location, however. As such, the user may tilt the mobile computing device 100 toward or in a specific direction, for example in the direction of the top right corner, as indicated by the arrow in FIG. 4. In other words, the top right corner of the mobile computing device 100 is closer to the ground than other parts of the mobile computing device 100.

Figure 5:
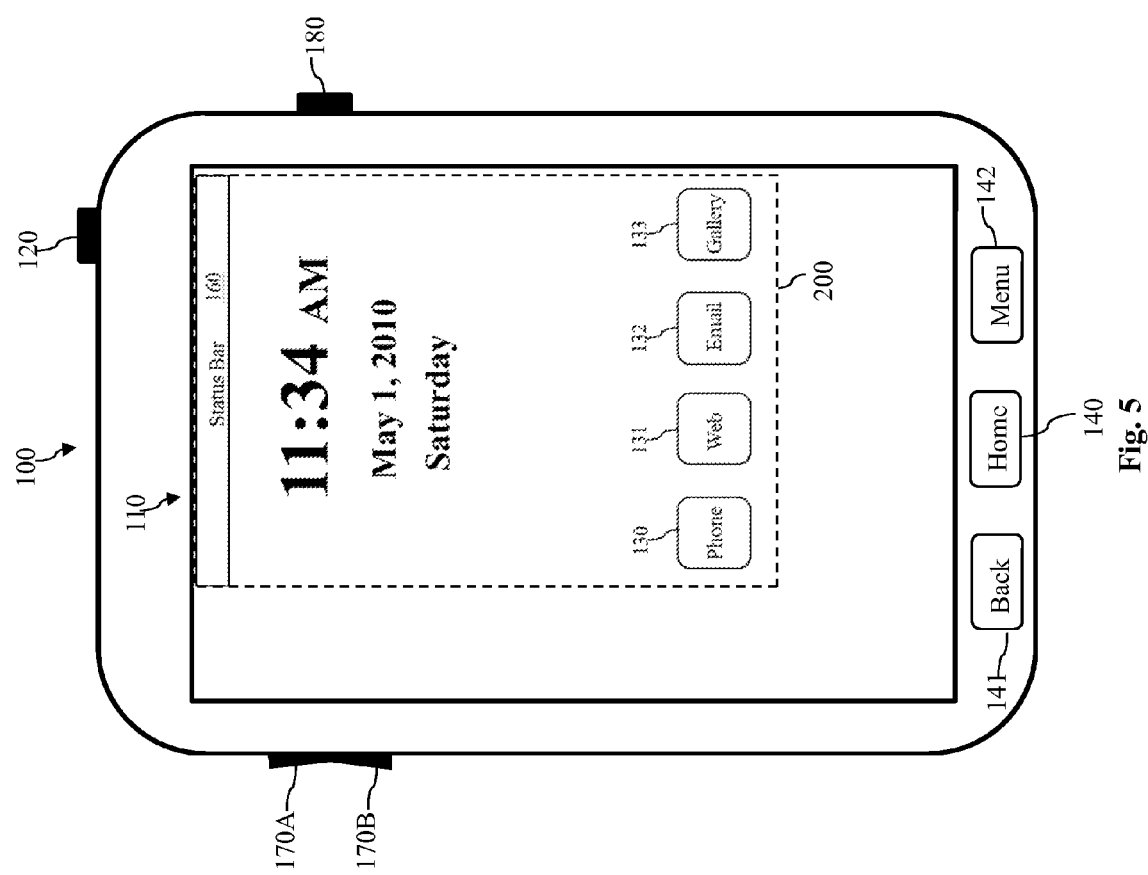

The mobile computing device 100 includes one or more sensors such as gyroscopes that can detect the tilting of the mobile computing device 100. As the mobile computing device 100 detects that the user is tilting the mobile computing device 100 in the top right direction, it will adjust the location of the scaled-down visual content accordingly, so that the scaled-down visual content may now appear at the top right corner, as shown in FIG. 5. The relocation of the scaled-down visual content may be instant in some embodiments, but may also be more gradual or smooth in other embodiments.

It is understood that tilting the mobile computing device 100 is merely one of many ways to readjust the location of the scaled-down visual content on the screen 110. In some other embodiments, the user may "hold down" the scaled-down visual content and "drag" it (for example with the thumb or another finger) to a desired location on the screen 110. Therefore, the initial location (for example near the center of the screen 110 shown in FIG. 4) of the scaled-down visual content may be changed to the user-specified location (for example near the top right corner of the screen 110 shown in FIG. 5) in response to user input.

To avoid confusion, the user may be allowed to hold and drag only an edge or a corner of the scaled-down visual content in certain embodiments, because doing so with an interior portion of the scaled-down visual content may run the risk of inadvertently trigger an unintended action or launch an application accidentally. This is because the objects of the scaled-down visual content can be interactively engaged by the user, as discussed in more detail below. Holding and dragging the edge or corner regions of the scaled-down visual content may be deemed "safer" since doing so to the normal-sized visual content (e.g., shown in FIG. 1) may be meaningless anyway, and therefore would not have triggered any actions or launched any applications unintentionally.

Figure 6:
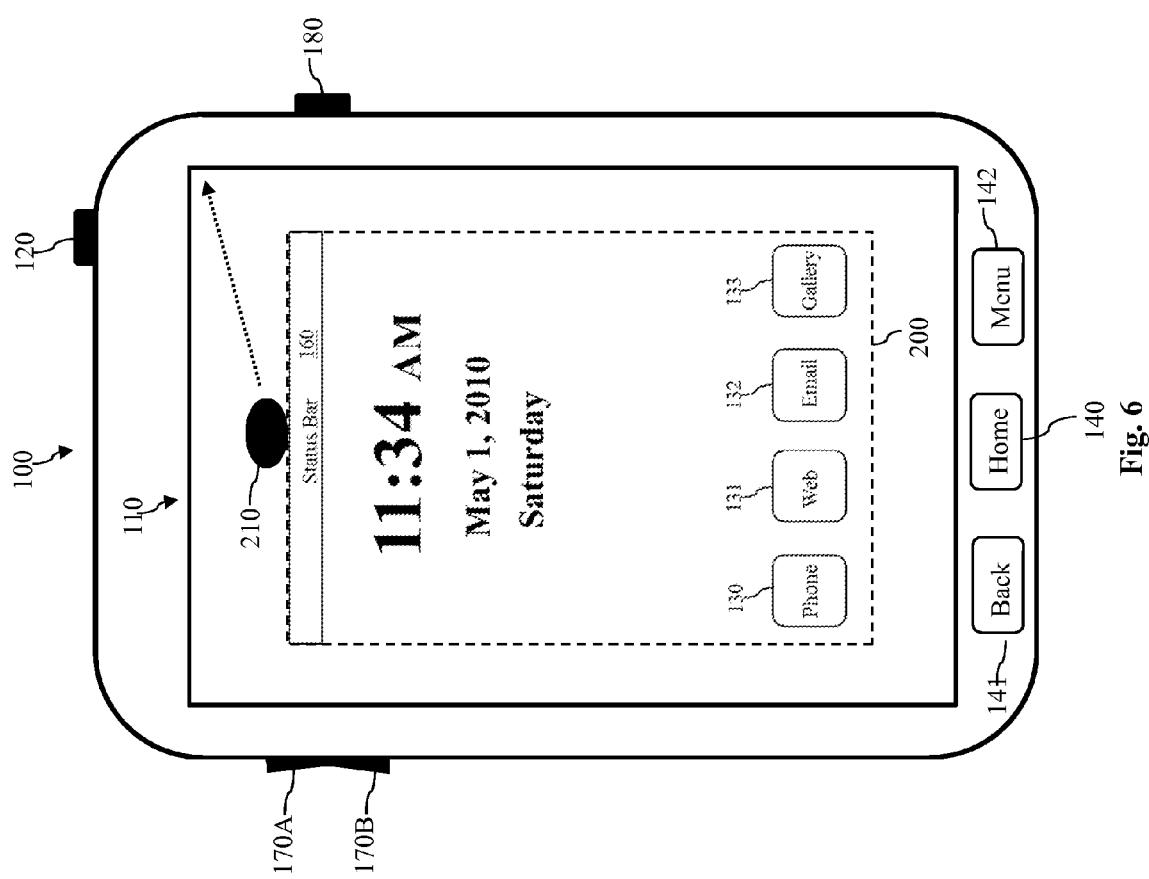

In some embodiments, the scaled-down visual content may be accompanied by a virtual handle 210, such as shown in FIG. 6. Since the virtual handle 210 is not a part of the scaled-down visual content anyway, the user may hold and drag it (or otherwise interact with it) with no fear of triggering unintentional actions. If the user holds and drags the virtual handle 210 in a specified direction or to a specified area, for example toward the top right corner of the screen 110, the entire scaled-down visual content is moved along with the virtual handle 210. Thus, the user may freely adjust the location of the scaled-down visual content by moving the virtual handle 210. In some embodiments, the user may also "flick" the handled 210 in a specific direction (e.g., the top right direction), and the scaled-down visual content may be instantly displayed at the top right of the screen 110.

Regardless of how the user chooses to change the location of the scaled-down visual content, it can be seen that the user can now effortlessly reach every part of the scaled-down visual content with just the thumb (or another finger) of the hand holding the mobile computing device. Again, the thumb need not reach every part of the screen 110 in order to access the visual content, only regions of the screen 110 at which the scaled-down visual content is displayed.

In some embodiments, the scaled-down visual content may also include virtual navigation buttons. For example, in the embodiment shown in FIG. 7, the scaled-down visual content (defined by the boundaries 200) not only includes the objects shown on the screen 110 in FIG. 1, but also virtual versions of the navigation buttons 140-142. This is useful when the user is attempting to engage with any of the navigation buttons 140-142, rather than other objects of the visual content. For example, the user may wish to press the back button 141. Unfortunately, for reasons similar to those discussed above, it is just as difficult for the user to reach the back button 141 with the thumb of the hand holding the mobile computing device 100, if not more so. Stated differently, the large size of the screen 110 means that the thumb of the user would have to travel a far distance in order to reach the back button 141. The same may apply for any of the other navigation buttons 140 and 142.

Figure 7:
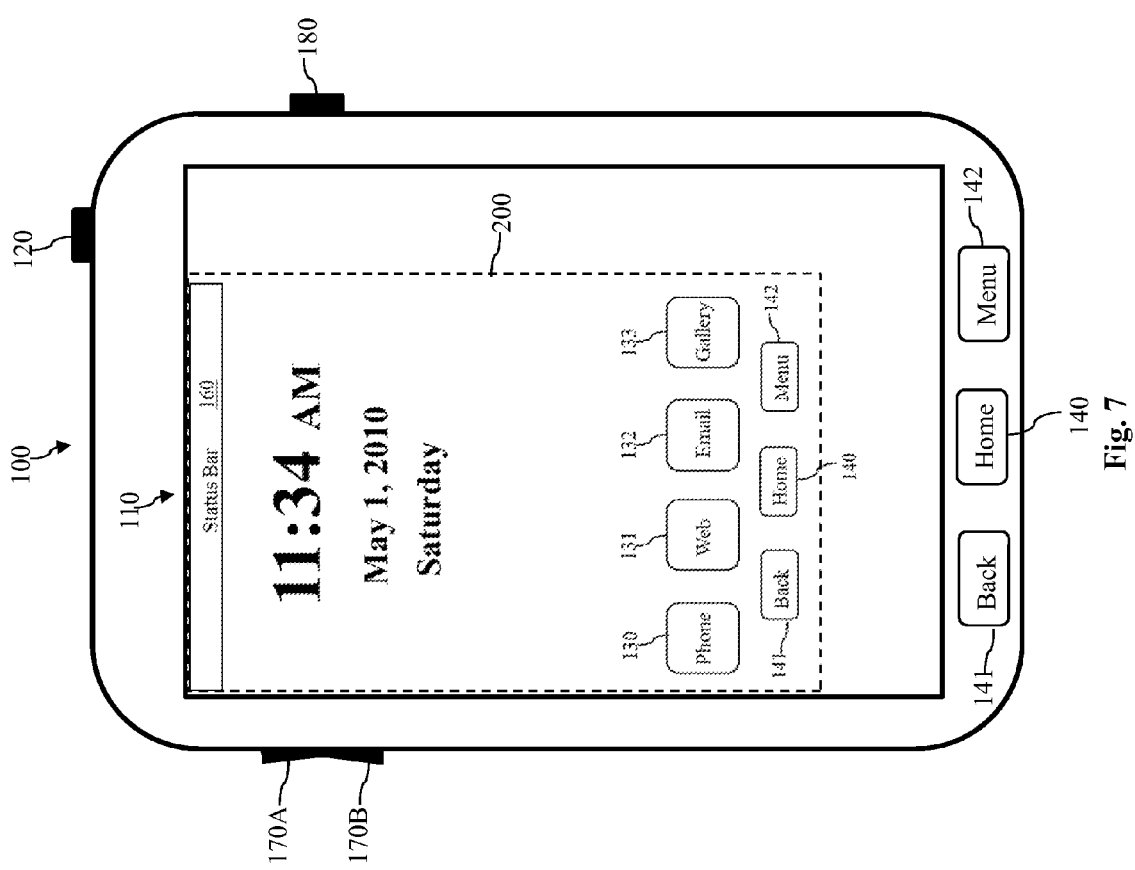

According to the present disclosure, a scaled-down virtual version of the back button 141 (and of the other navigation buttons 140 and 142) may be appended to the scaled-down visual content, such as shown in the embodiment in FIG. 7. As discussed above, the smaller size of the scaled-down visual content, coupled with the fact that it may be closer-located to the thumb of the user's hand holding the mobile computing device 100, means that the user can now more easily access every part of the scaled down visual content with just one hand. This ease of one-handed operation applies to the scaled-down virtual navigation buttons as well, meaning that the user may be able to easily reach the scaled-down virtual versions of the navigation buttons 140-142.

It is understood that the scaled-down virtual versions of the navigation buttons may appear naturally as a part of the scaled-down visual content in some embodiments. This occurs when the mobile computing device 100 does not utilize physical (whether recess-able or capacitive) buttons for the navigation, but displays virtual navigation buttons on the screen 110 as a part of the original visual content. This scenario is illustrated in FIGS. 8-9.

Figure 8:
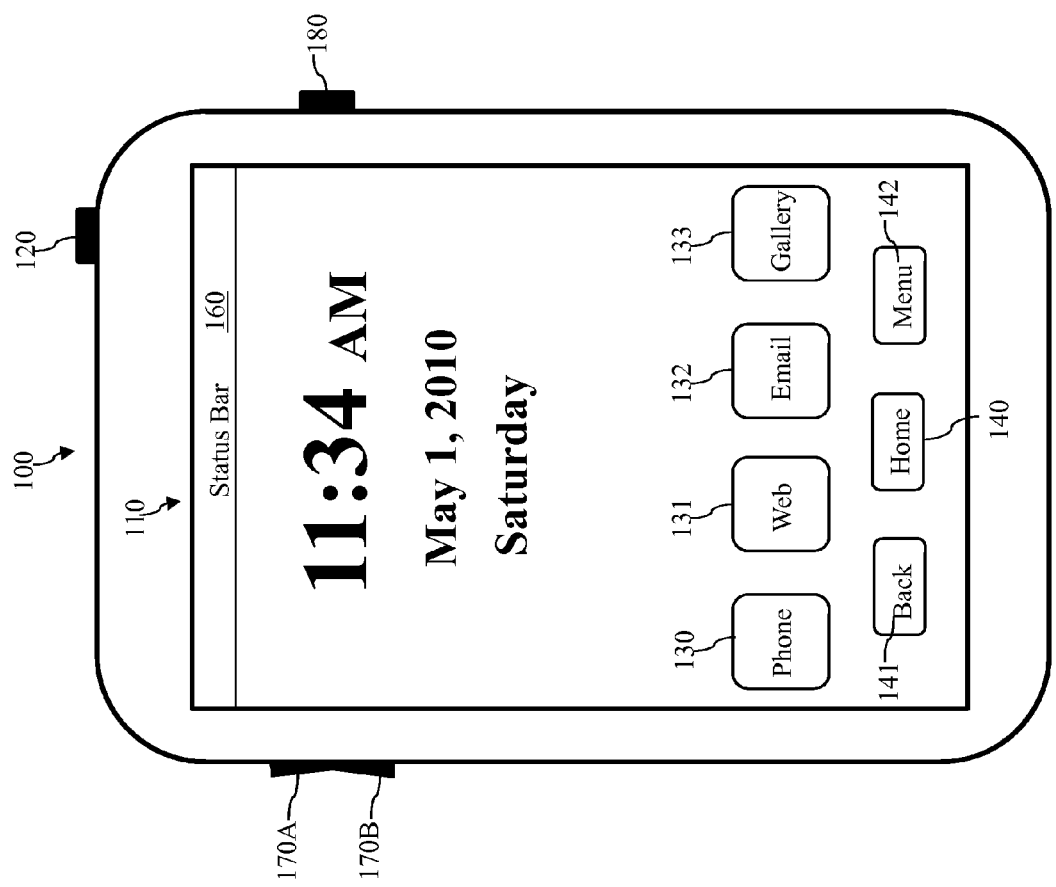
Figure 9:
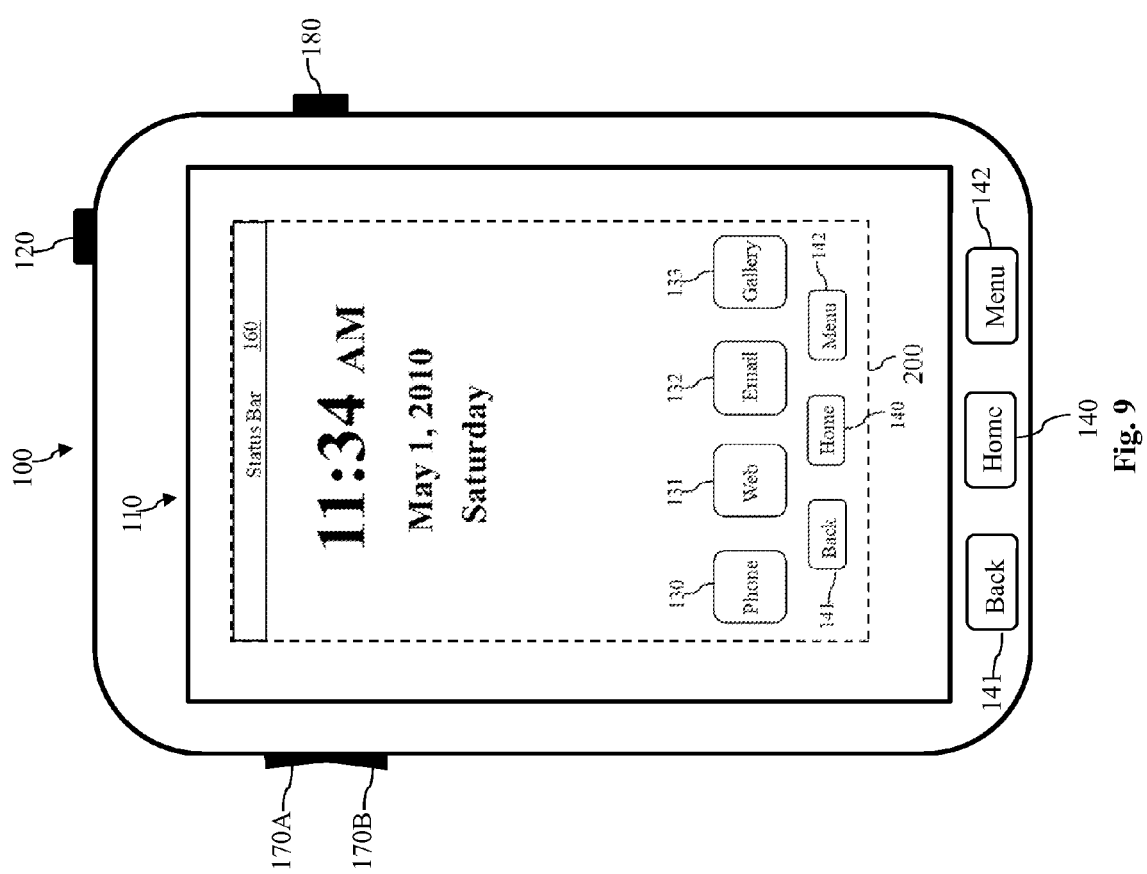

Referring to FIG. 8, the mobile computing device 100 is similar to the mobile computing device 100 shown in FIG. 1, except that the physical navigation buttons 140-142 below the screen 110 have been replaced by virtual navigation buttons 140-142 as a part of the visual content displayed on the screen 110. Now, as shown in FIG. 9, when the user performs an action (such as engaging the button 180) to shrink the visual content, the scaled-down visual content (defined by the boundaries 200) naturally includes the scaled-down virtual navigation buttons 140-142 as well. Again, the user may easily reach the virtual navigation buttons 140-142 in the scaled-down visual content.

Figure 10:
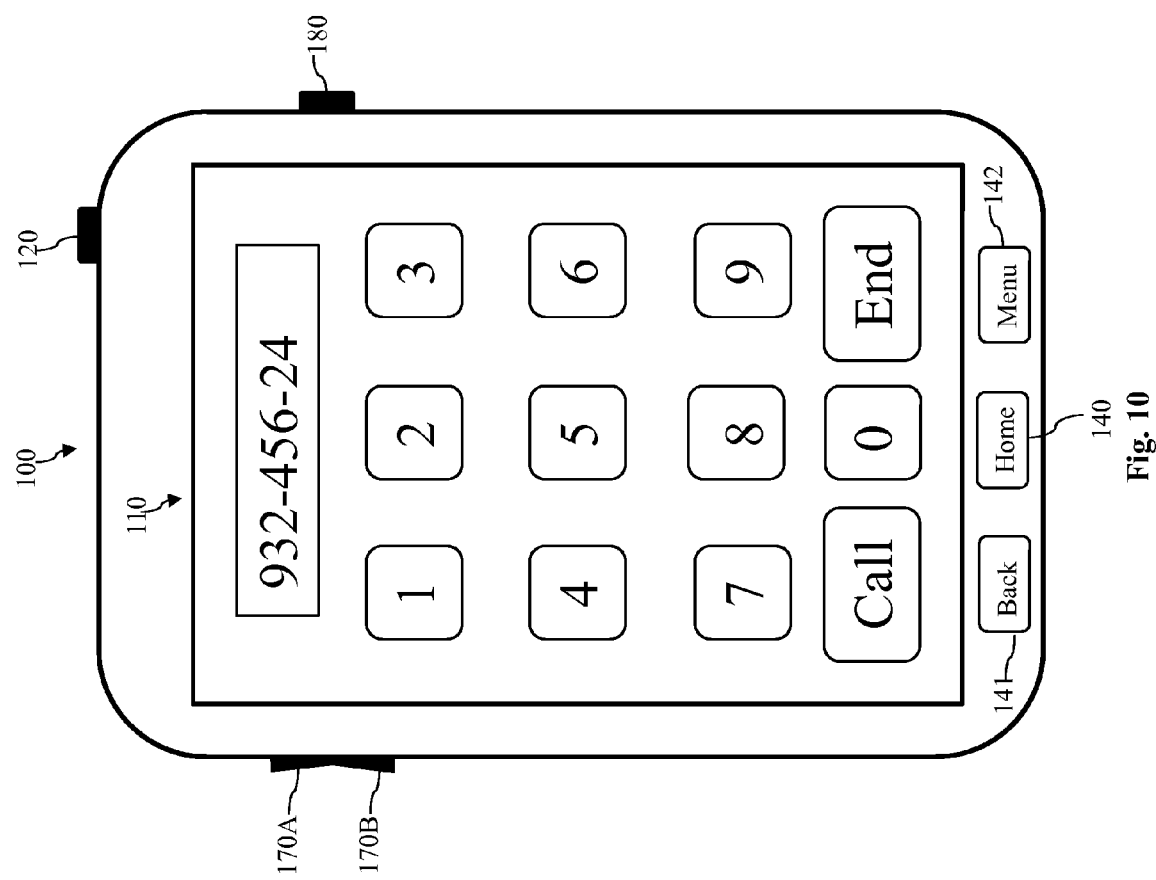

The user may interactively engage with the objects in the scaled-down visual content in substantially the same manner as with the normal sized visual content (e.g., shown in FIGS. 1 and 8). For example, the user may engage with the icon 130 ("Phone") in the scaled-down visual content in FIGS. 2-7 and 9. The engagement may include clicking on the icon 130 or dragging it across a part of the screen 110. By doing so, a "Phone" application may be launched, such as shown in FIG. 10. The "Phone" application now occupies a substantial entirety (if not all) of the screen 110 in the embodiment shown. The "Phone" application may also be considered visual content displayed on the screen 110, albeit a different type of visual content than the visual content displayed before the "Phone" application is launched.

Of course, the user may also scale down or shrink the "Phone" application if he/she wishes. For example, if the user wants to reach the key "7" or the button "Call" in the "Phone" application but finds it far away and difficult to reach with one hand, he/she may shrink the "Phone" application (e.g., by pressing the button 180). Thereafter, a scaled-down or shrunken "Phone" application (defined by boundaries 200) appears in FIG. 11. The user may engage with the scaled-down "Phone" application in the same manner as with the normal-sized "Phone" application shown in FIG. 10. In the embodiment shown in FIG. 11, scaled-down virtual navigation buttons 140-142 are appended to the scaled-down "Phone" application, but it is understood that these virtual navigation buttons 140-142 may not necessarily be implemented in other embodiments.

Figure 12:
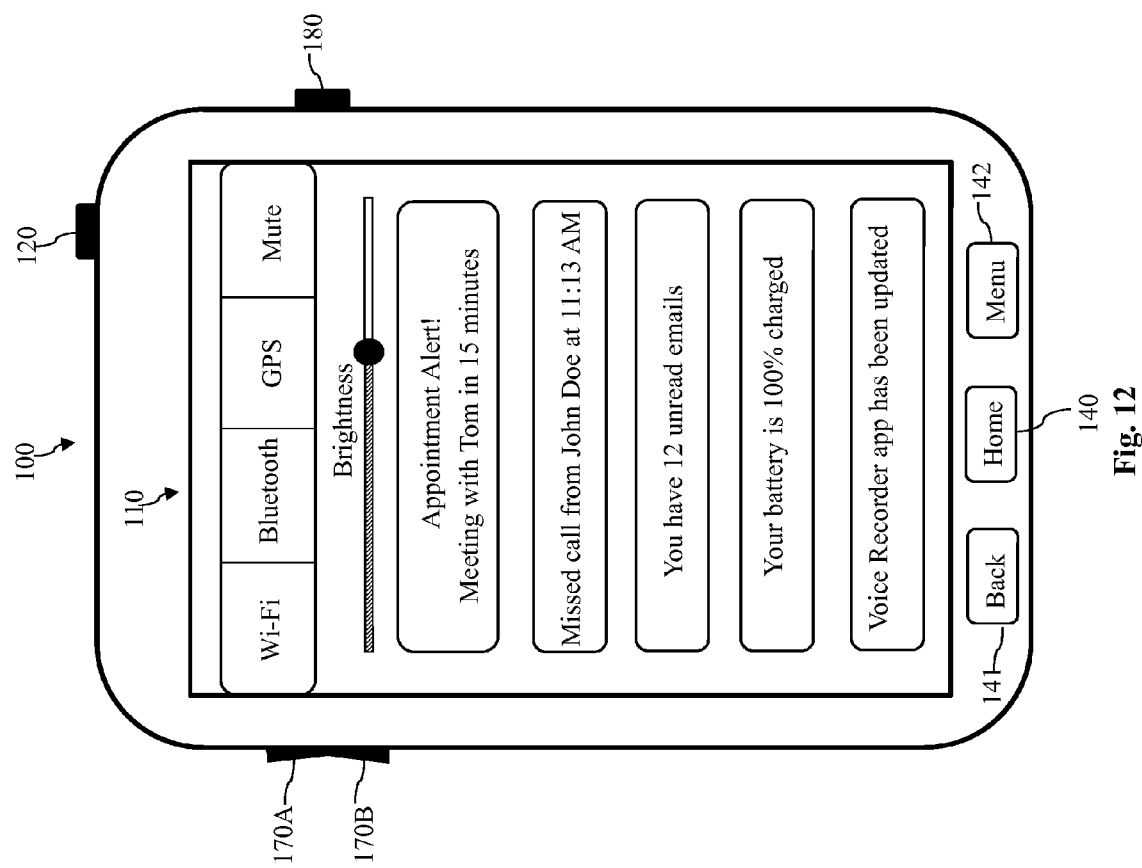

FIG. 12 illustrates another example of triggering an action via user engagement with the scaled-down visual content. In more detail, as the user swipes down a status bar appearing as a part of the scaled-down visual content (e.g., the status bar 160 shown in FIGS. 2-7 and 9), a "pull-down notification" menu may appear as the new visual content now occupying the screen 110. The "pull-down notification" menu may include one or more toggles such as toggles for turning on or off Wi-Fi, Bluetooth, GPS, or sound (Mute). The "pull-down notification" menu may also include one or more slider control mechanisms for adjusting settings such as screen brightness. The "pull-down notification" menu may further include one or more status updates or alerts such as upcoming appointments, missed calls, unread emails, battery status, or updates to one or more apps on the mobile computing device 100. Among other things, the "pull-down notification" menu gives the user a preview of relevant information and allows the user to quickly configure important settings of the mobile computing device 100. It is understood that the "pull-down notification" menu shown in FIG. 12 is merely an example notification menu, and other notification menus may be implemented differently in alternative embodiments.

In any case, since the "pull-down notification" menu is invoked by the user performing a swiping action from the top of the screen 110, large screens may render this task difficult to perform with just one hand. Here, since the visual content on the screen 110 has been scaled down according to the various aspects of the present disclosure, it is easier now for the user's thumb (or another finger) to reach the new "top edge" of the boundaries 200, where the status bar 160 is located. The user can therefore easily swipe down the status bar 160 of the scaled-down visual content, as its new location is easier for the user's finger to reach even though the mobile computing device is being held one-handed.

It is understood that the notification menu itself may be scaled down as visual content. For example, if the user wants to do a quick toggle of the Wi-Fi setting, which is located in the top left corner of the screen 110, he/she may press the button 180 to obtain a size-reduced version of the notification menu, which allows the user to more easily reach the Wi-Fi toggle button.

Figure 13:
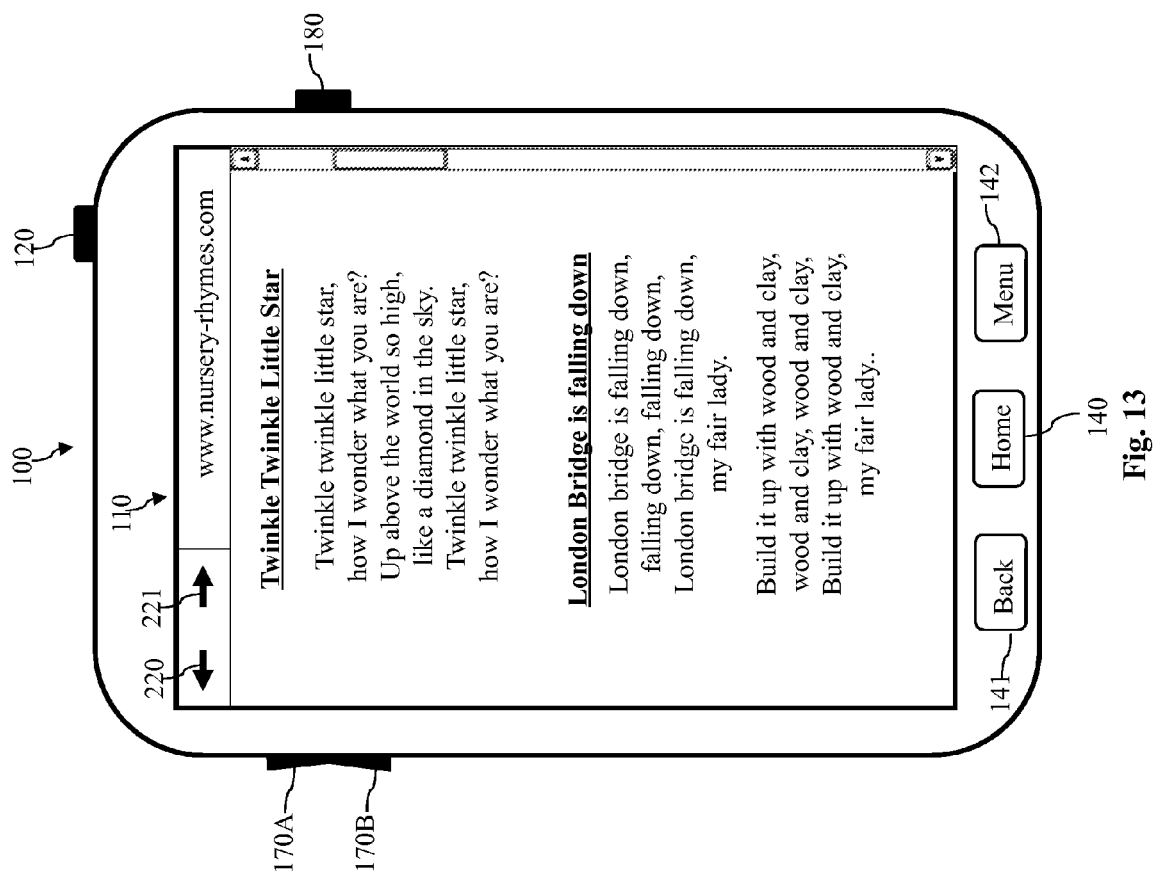
Figure 14:
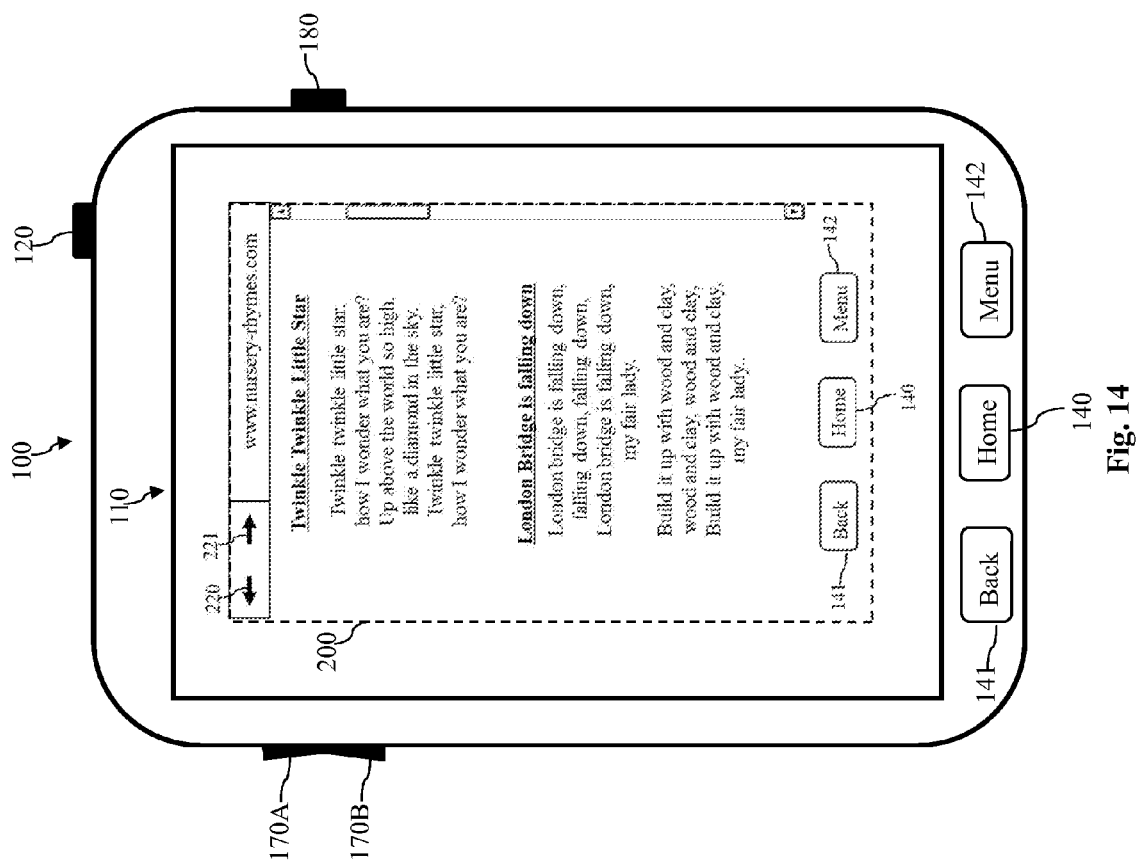

FIGS. 13-14 illustrate yet another example of triggering an action via user engagement with the scaled-down visual content. In more detail, FIG. 13 illustrates a nursery rhymes web page as the original visual content displayed on the screen 110. The web page occupies an entirety of the screen 110 in the illustrated embodiment. In other embodiments, the web page may occupy most but not necessarily all of the screen 110, as some screen real estate may be reserved for a status bar (similar to the status bar 160) at the top of the web page or virtual navigation buttons at the bottom of the web page. The web page includes integrated virtual navigation buttons 220 and 221 that allows the user to return to a previous web page or go to a next web page. The back button 141 (a physical button in this example) may also allow the user to return to a previous web page.

As discussed above, due to the location of the integrated virtual navigation buttons 220-221 (i.e., near a corner of the screen 110), it may be difficult for the user to reach them while holding the phone one-handed. The same is true if the user wishes to reach the back button 141 (or the home button 140 or menu button 142). According to the present disclosure, the user may perform an action to shrink the web page down, for example by pressing the button 180. The shrunken web page is shown in FIG. 14. The shrunken virtual navigation buttons 140-142 are also appended at the bottom of the web page in case the user wishes to engage them. It can be clearly seen that the integrated virtual navigation buttons 220-221 on the web page are now located closer to the user's hand and are more easily accessible by the user's finger. The user may now engage with one of these buttons 220-221 or 140-142 to perform a task, such as returning to a previous web page by pressing the scaled-down virtual back button 141 or the integrated virtual button 220.

Figure 15:
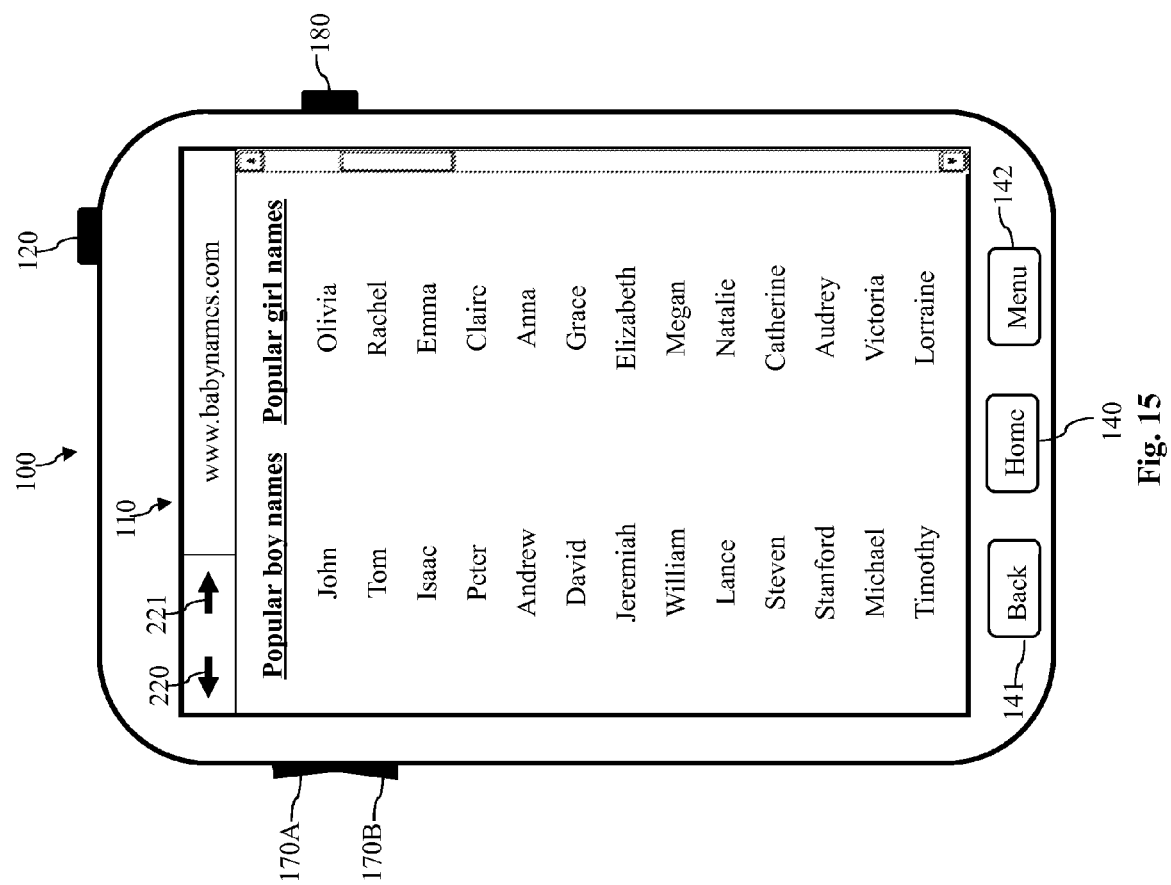

Referring now to FIG. 15, after the user presses the scaled-down virtual back button 141 or the integrated virtual button 220, the previous web page is displayed on the screen

110, which is a web page showing possible baby names in this example. As new visual content (differing from the visual content that is the shrunken web page shown in FIG. 14), this baby names web page may now occupy an entirety of the screen in the illustrated embodiment. Again, some portion of the screen real estate may be reserved for a status bar or one or more virtual navigation buttons in some embodiments as well.

Figure 16:
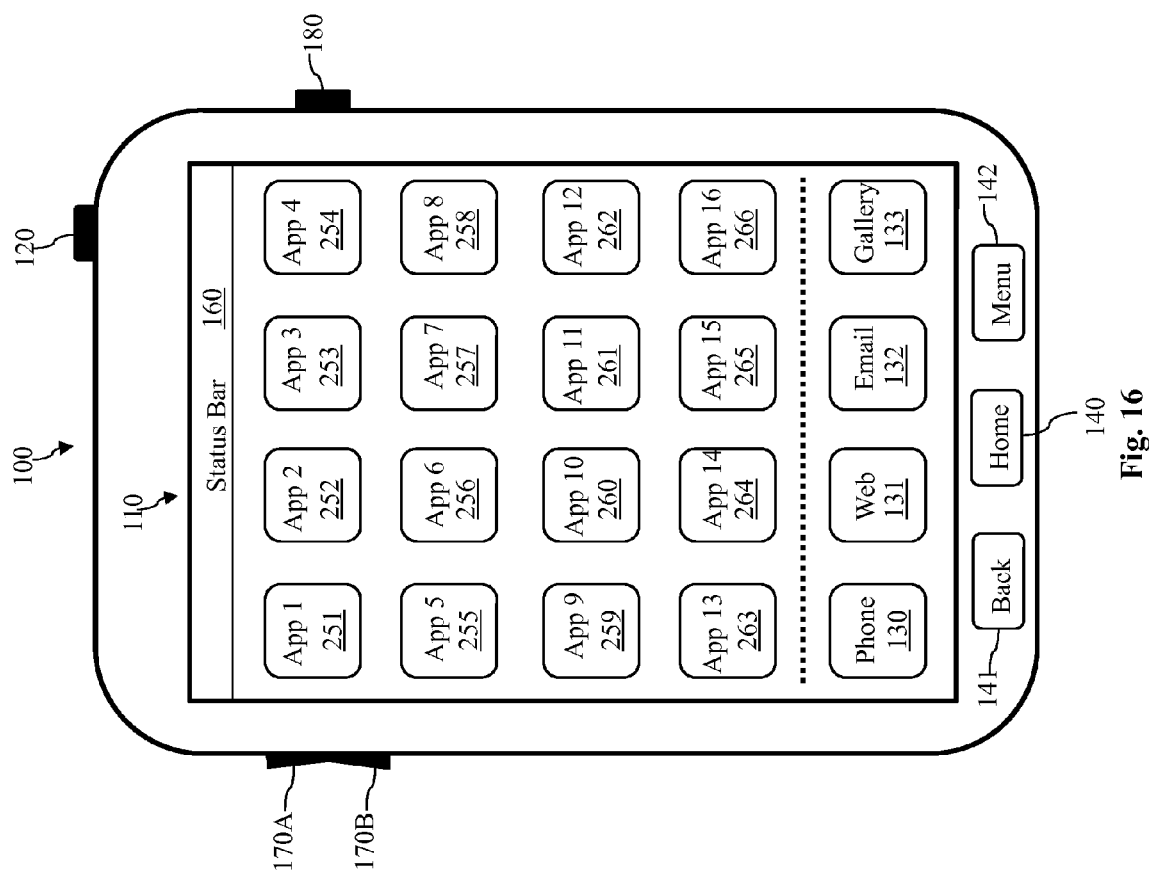
Figure 17:
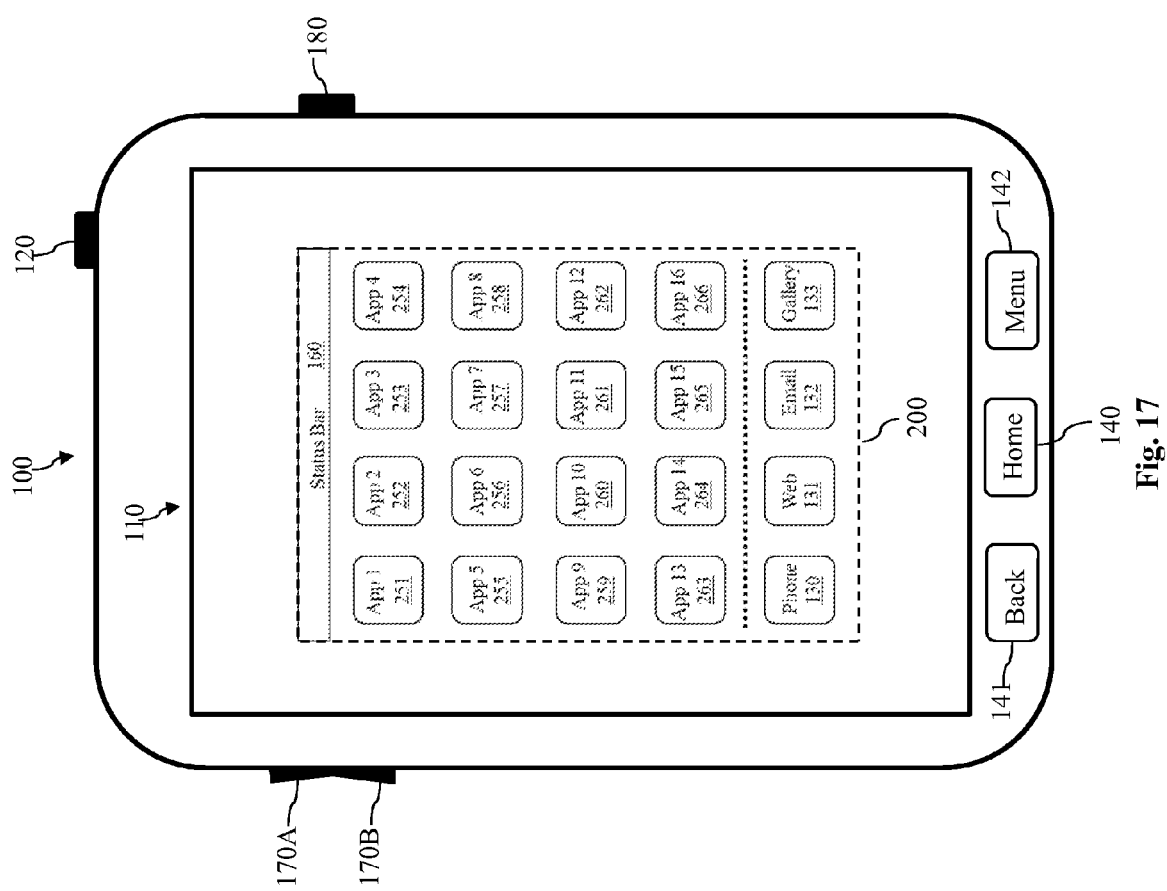

FIGS. 16-17 illustrate yet another example of triggering an action via user engagement with the scaled-down visual content. In more detail, FIG. 16 illustrates an example home screen displayed on the screen 110 of the mobile computing device 100. In addition to the status bar 160 and the icons 130-133, the home screen includes a plurality of apps 251-266 (or shortcuts to the apps). The home screen may be swiped left or right to reveal additional apps or widgets. Suppose that the user wishes to launch the app 251, which in this example is a compass. Again, the location of the app 251 (at the top left corner of the screen 110) and the big size of the screen 110 makes it difficult for the user to reach the app 251 with a finger of the hand that is holding the mobile computing device 100.

Figure 18:
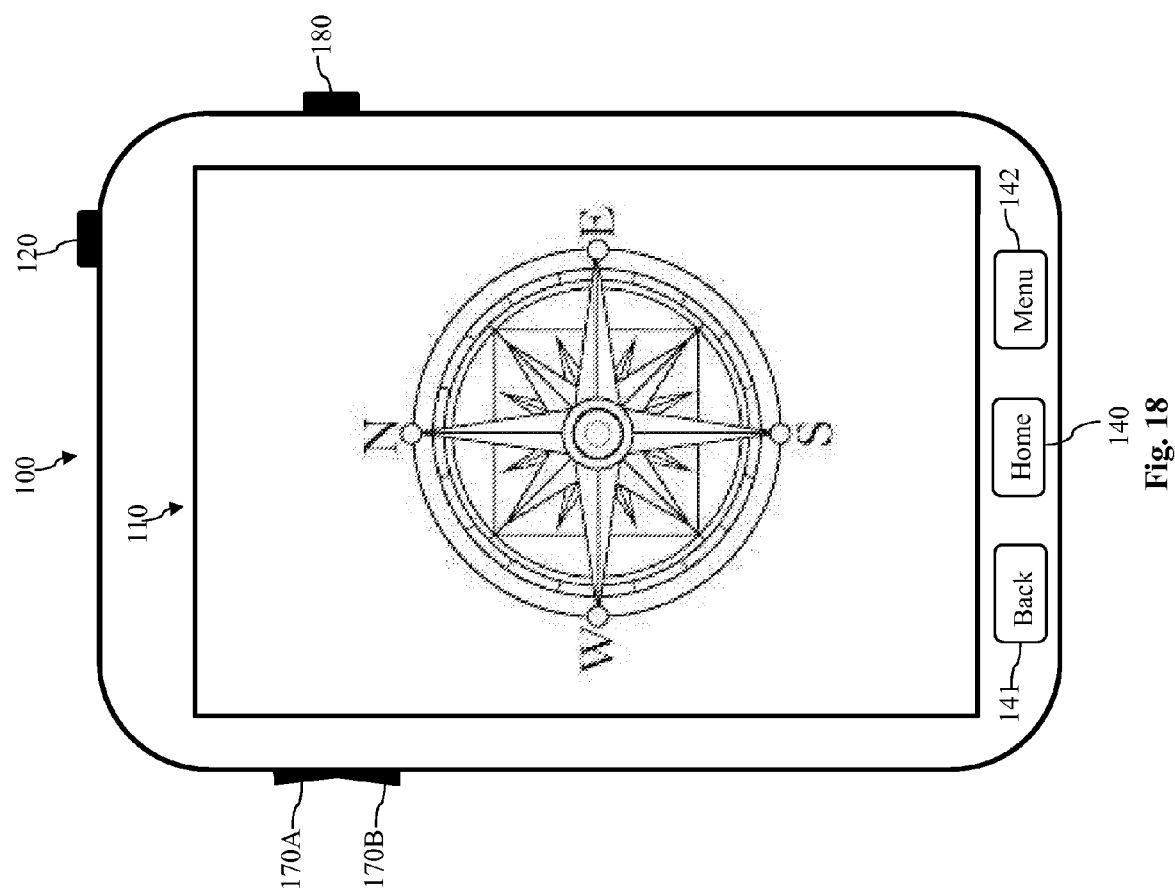

According to the present disclosure, the user may perform an action to scale down the home screen, for example by pressing the button 180. The scaled-down home screen is shown in FIG. 17, the boundaries of which may again be designated by the reference numeral 200. In the illustrated embodiment, no virtual navigation buttons appear as a part of the scaled-down home screen, but it is understood that virtual navigation buttons may be appended to the scaled-down home screen in other embodiments. Again, the new location of the app 251 is easier for the user's finger to reach. As the user clicks on the app 251, a compass application is launched, as shown in FIG. 18. The launched compass application may occupy a substantial entirety of the screen 110 in some embodiments, or merely a portion thereof in other embodiments.

From the above discussions, it can be seen that the scaling down or the size-reduction of existing visual content on the screen 110 according to the various aspects of the present disclosure greatly facilitates one-handed operation of the mobile computing device 100. Although the scaling down of the visual content is accomplished by an engagement with the button 180, as discussed above, it is understood that this is merely one of many ways to accomplish the scaling down of the visual content. Other methods of performing the scaling down process are now discussed below.

In some embodiments, the volume rocker 170 may be used to perform the process of scaling down the visual content. For example, the portions 170A and 170B may be simultaneously pressed down to perform a function equivalent to pressing down the button 180. In other words, a simultaneous press of both portions 170A-170B of the volume rocker 170 triggers the scaling down process discussed above. In embodiments where the volume up and volume down are implemented as physically separate buttons, then both of these buttons may be pressed down simultaneously to trigger the visual content scaling down process discussed above.

Figure 19:
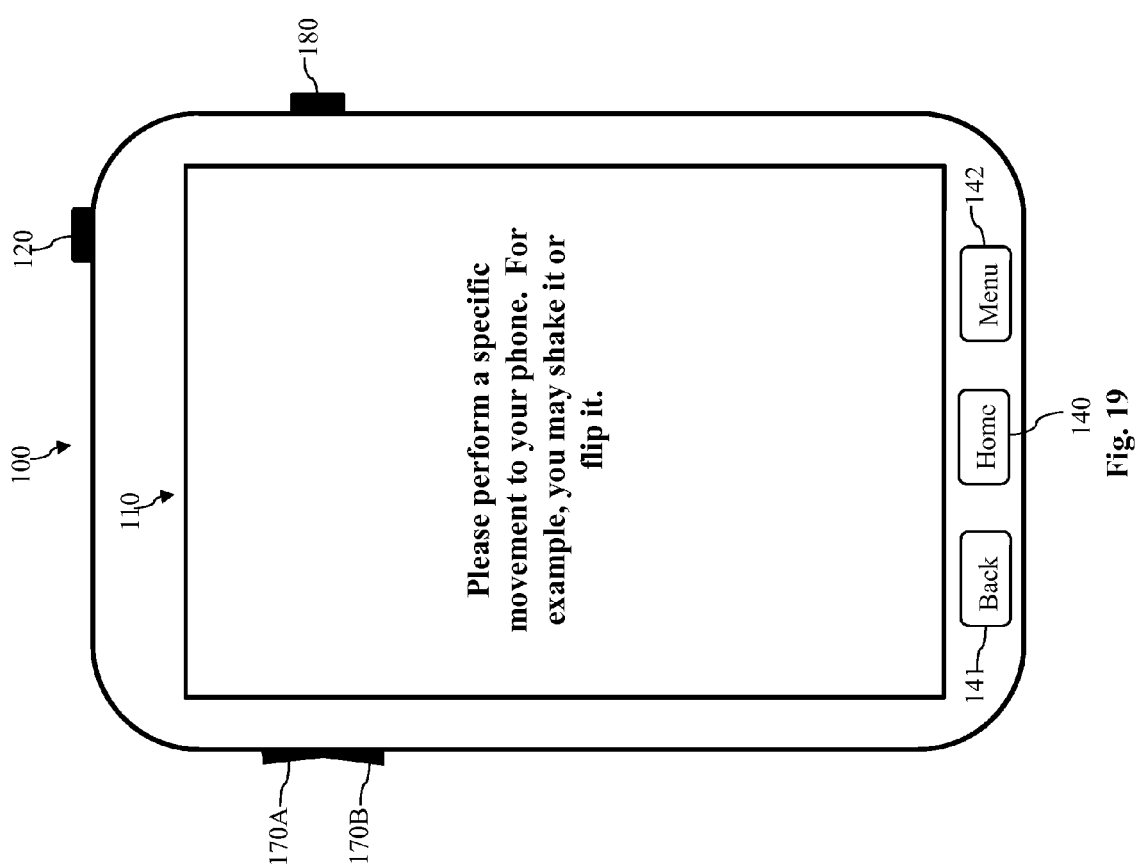

In yet other embodiments, the user may perform a rapid movement with the mobile computing device 100. For example, in some embodiments, the user may shake the mobile computing device 100 front to back (or vice versa), or up to down (or vice versa), or left to right (or vice versa). In other embodiments, the user may flip the mobile computing device 100 forward and backward, which may also be repeated a few times in certain embodiments. In certain embodiments, the rapid movements of the mobile computing device 100 may be defined by the user. For example, as shown in FIG. 19, the user may be prompted in a settings menu to perform a particular movement with the mobile computing device 100, and be instructed that the performance of this particular movement will thereafter be interpreted as a command to perform the visual content scaling down process discussed above. The mobile computing device 100 has one or more motion sensors such as accelerometers or gyroscopes that can detect the movement performed by the user. Thereafter, if these sensors detect the movement of the mobile computing device 100 as defined by the user, the mobile computing device 100 may interpret these movements as the user wanting to scale down the visual content displayed on the mobile computing device 100. Accordingly, the visual content scaling down process discussed above may be performed. The user-defined movement of the mobile computing device 100 allows the user to pick a movement that he/she feels comfortable to perform, in order to perform the visual content scaling down process.

Of course, the rapid movement of the mobile computing device 100 may be predefined by default by its manufacturer as well. In other words, without requiring user input, the manufacturer of the mobile computing device may have already configured the mobile computing device 100 to detect a shake or a flip of the mobile computing device 100 as a user command to perform a visual content scaling down process.

In some other embodiments, the user may quickly tap an "empty" or "blank" area of the screen a plurality of times in succession in order to perform the visual content scaling down process discussed above. The "empty" or "blank" area may be, as examples, an area on the screen other than the keys in the "Phone" application in FIG. 10, an area without text on the web page in FIG. 13, or an area outside the icons 130-133 and apps 251-266 in FIG. 16. The taps may need to be within fractions of a second within each other to be considered "successive." As an example, the user may double-tap a blank area on the screen shown in FIG. 16, wherein the two taps occur within 0.2 seconds of each other or less. These actions may also invoke the scaling down process discussed above.

In yet other embodiments, the visual content scaling down process may be invoked automatically based on the user's interactions with the mobile computing device 100. For example, the mobile computing device 100 may have one or more proximity sensors implemented at and/or near each of the four corners of the screen 110. As the user is attempting to reach one of these corners with a finger, the proximity sensors at or near that corner may sense the presence of the finger. The mobile computing device 100 may be programmed to interpret that as the user wanting to reach an object near that corner, and thus the visual content scaling down process discussed above should be performed. Of course, the proximity sensors may not necessarily be confined to the four corners or the regions nearby either. In some embodiments, the proximity sensors may be implemented at or near all the edges of the screen 110.

In yet further embodiments, the mobile computing device 100 may have pressure sensors implemented at or near its edges. If an increased pressure is detected by these pressure sensors, that may be an indication that the user is squeezing the mobile computing device 100 in the process of reaching a hard-to-reach region on the screen 110, for example a corner region. Therefore, the mobile computing device 100 may be programmed to automatically perform the visual content scaling down process discussed above when an increased pressure around the edges of the mobile computing device 100 is detected.

In yet other embodiments, the visual content scaling down process discussed above may be invoked by a voice command from the user.

The embodiments discussed above involve performing the visual content scaling down process when the visual content has already been displayed on the screen 110. However, it is understood that the actions (for invoking the scaling down process) may be performed even while the screen 110 of the mobile computing device 100 is turned off. For example, if the user wishes to access a scaled-down lock screen (such as illustrated in FIGS. 2-7), the user may press the button 180, or pressing on both portions of the volume rocker 170A-170B simultaneously, or shake the mobile computing device 100, or double tap on the screen 110, or squeeze the mobile computing device 100, while the screen 110 is turned off. Thereafter, when the user powers on the screen 110, the scaled-down lock screen will already be displayed on the screen 110, rather than the normal-sized lock screen. Alternatively, the performance of one or more of these actions may automatically turn on the screen 110 (without having to press the power button 120) in the process.

Figure 20:
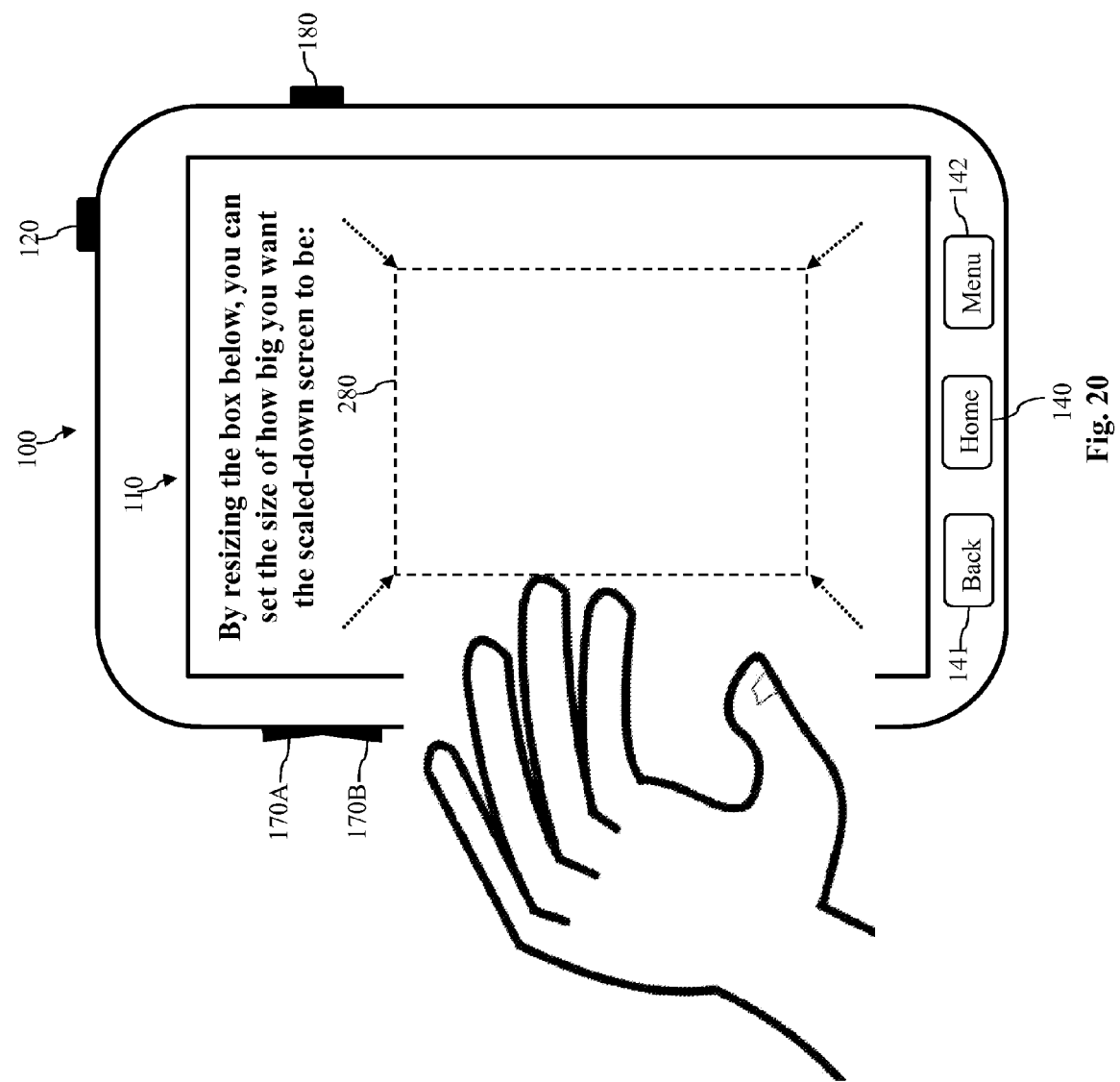

It is also understood that the user may be allowed to customize or configure the size of the reduced visual content. Referring to FIG. 20, the mobile computing device 100 may prompt the user to specify a desired size for the scaled-down visual content. This may occur either when the user is performing initial configurations of the mobile computing device 100, or as the user triggers it via certain settings. A box 280 is displayed on the screen 110. The box 280 represents the total size of the scaled-down visual content and therefore may correspond to the boundaries 200 shown in FIGS. 2-7, for example. The user may resize the box 280 by dragging and moving the edges or corners of the box 280.

Once the user is satisfied with the size of the box 280, that size will be recorded by the mobile computing device 100. Thereafter, whenever the visual content scaling down process discussed above is performed, the scaled-down visual content will match the size of the box 280. In this manner, the user can create customized scaled-down visual content, which is beneficial. For example, users with smaller hands may create a smaller box 280, so that the scaled-down visual content is even more reachable with the finger. Users with larger hands may create a larger box 280, as that user may not necessarily need the visual content to be scaled down too much for comfortable one-handed use.

The user-customization of the size of the scaled-down visual content also adds more flexibility with respect to different display sizes. Rather than having the same (or substantially similar) size for the scaled-down visual content in terms of the fraction of the screen 110 (e.g., ½ of the size of the screen 110), the user may define an absolute size that is comfortable for him/her. In other words, a 4.7 inch smartphone and a 6.5 inch tablet computer may each have the same size box 280 (e.g., 3.2 inches diagonally) as defined by the same user, even though the box 280 may represent about ⅔ of the total screen area of the smartphone but may represent about ½ of the total screen area of the tablet computer.

The visual content scaling down process discussed solves the current one-handed use difficulties associated with large smartphones or small tablet computers. Since the scaled-down visual content is easy to access, one-handed operation is comfortable and convenient. Meanwhile, the user may still be able to enjoy the benefits offered by a big screen when appropriate, such as when watching movies, browsing web pages, playing games, reading electronic books, viewing digital pictures, or otherwise not needing to access every remote area of the screen. As such, the present disclosure allows large smartphones and small tablet computers to enjoy the best of both worlds: offering the full experience of a large-screen electronic device while providing the simplicity and usability of a smaller device.

Figure 21:
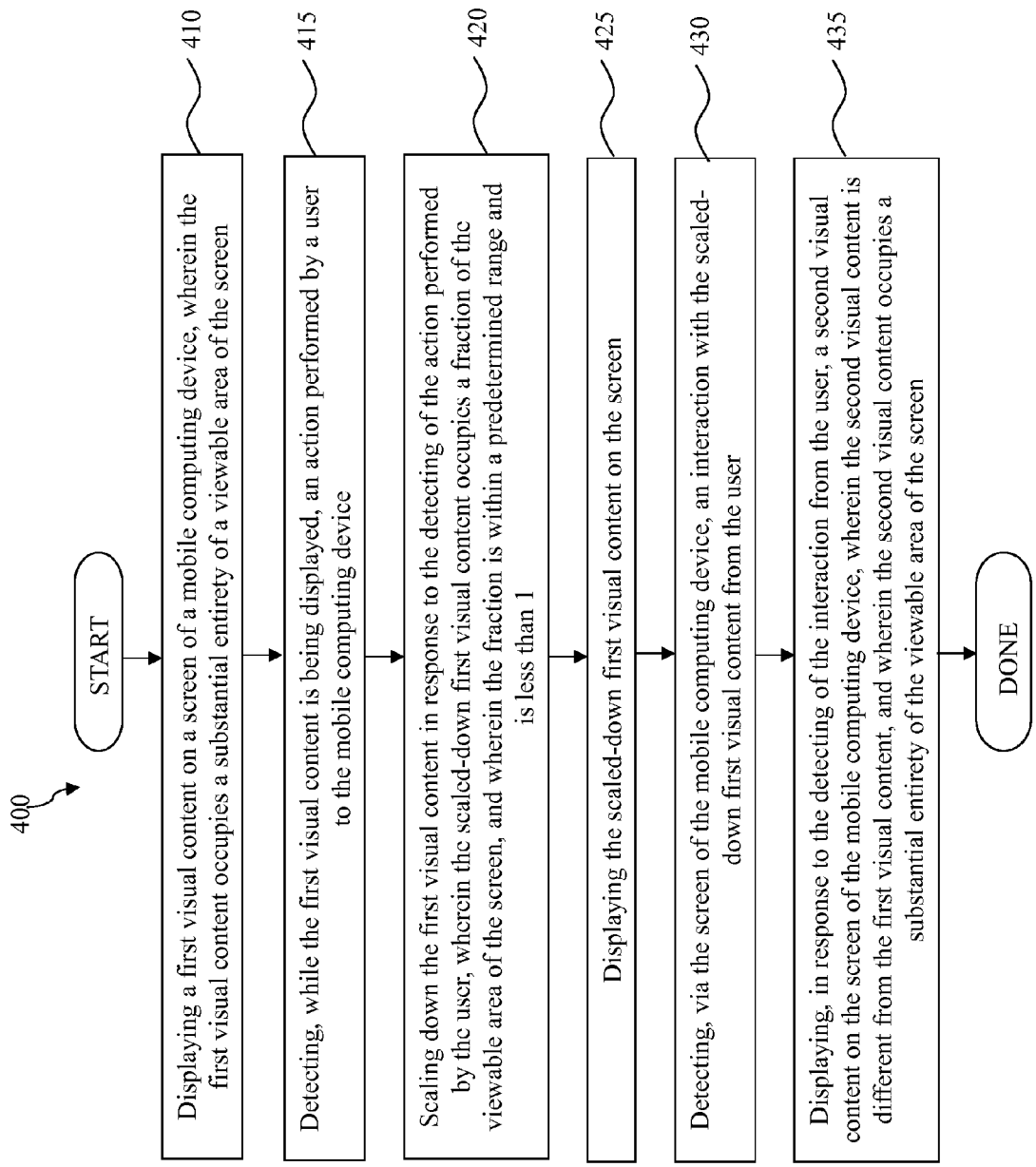
FIG. 21 is a flowchart illustrating an example method for performing a visual content scaling down process according to various aspects of the present disclosure.

FIG. 21 is a simplified flowchart illustrating a method 400 for performing a visual content scaling down process to facilitate the one-handed operation of a large-screen electronic device according to various aspect of the present disclosure. One or more steps of the 400 are performed by a mobile computing device of the user. In some embodiments, the mobile computing device includes a smartphone, a tablet computer, or a laptop/tablet hybrid.

The method 400 includes a step 410 of displaying a first visual content on a screen of a mobile computing device. The first visual content occupies a substantial entirety of a viewable area of the screen. In some embodiments, the screen is a touch-sensitive screen that is responsive to the touch of a user's finger or a stylus. In some embodiments, the first visual content comprises: a home screen, a lock screen, a web page, a video, a picture, an electronic book, an application, an electronic game, or an electronic document.

The method 400 includes a step 415 of detecting, while the first visual content is being displayed, an action performed by a user to the mobile computing device.

The method 400 includes a step 420 of scaling down the first visual content in response to the detecting of the action performed by the user. The scaled-down first visual content occupies a fraction of the viewable area of the screen. The fraction is within a predetermined range and is less than 1.

The method 400 includes a step 425 of displaying the scaled-down first visual content on the screen.

The method 400 includes a step 430 of detecting, via the screen of the mobile computing device, an interaction with the scaled-down first visual content from the user.

The method 400 includes a step 435 of displaying, in response to the detecting of the interaction from the user, a second visual content on the screen of the mobile computing device. The second visual content is different from the first visual content. The second visual content occupies a substantial entirety of the viewable area of the screen.

In some embodiments, a diagonal dimension of the screen is in a range from about 4.5 inches to about 7 inches.

In some embodiments, the mobile computing device includes a dedicated physical button for scaling down visual content displayed on the screen, and the step 415 of detecting the action performed by the user comprises detecting a pressing of the dedicated physical button.

In some embodiments, the computing device includes one or more motion sensors; and the step 415 of detecting the action performed by the user comprises detecting, via the one or more motion sensors, a rapid physical movement of the mobile computing device.

In some embodiments, the mobile computing device includes a plurality of proximity sensors, and the step 415 of detecting the action performed by the user comprises detecting, via at least one of the plurality of proximity sensors, an attempt of the user to reach a corner region or an edge region of the screen with a thumb.

In some embodiments, the computing device includes one or more pressure sensors, and the step 415 of detecting the action performed by the user comprises detecting, via the one or more pressure sensors, a squeezing force applied by the user to the mobile computing device.

In some embodiments, the computing device includes a first mechanism and a second mechanism for increasing and decreasing a volume output of the mobile computing device, respectively, and the step 415 of detecting the action performed by the user comprises detecting a simultaneous pressing of the first and second mechanisms.

In some embodiments, the step 415 of detecting the action performed by the user comprises detecting a plurality of quick taps on the screen in succession.

In some embodiments, the step 415 of detecting the action performed by the user comprises detecting a voice command from the user.

In some embodiments, the first visual content includes one or more virtual navigation buttons, and the step 420 of scaling down the first visual content is performed such that the scaled-down first visual content includes the one or more virtual navigation buttons.

In some embodiments, the mobile computing device includes one or more physical navigation buttons, and the first visual content is free of any virtual navigation buttons. In these embodiments, the step 425 of displaying the scaled-down first visual content comprises appending one or more virtual navigation buttons to the scaled-down first visual content. The one or more virtual navigation buttons emulates the one or more physical navigation buttons.

In some embodiments, the method 400 may further include a step of detecting a position of a thumb of the user relative to the screen. In these embodiments, the step 420 of scaling down the first visual content comprises displaying the scaled-down first visual content in a region of the screen proximate to the thumb of the user.

In some embodiments, the method 400 may further include a step of determining whether the user is holding the mobile computing device with a left hand or with a right hand. In these embodiments, the step 420 of scaling down the first visual content comprises displaying the scaled-down first visual content in a region of the screen near a left edge if it has been determined that the user is holding the mobile computing device with the left hand; and displaying the scaled-down first visual content in another region of the screen near a right edge if it has been determined that the user is holding the mobile computing device with the right hand.

In some embodiments, the step 425 of displaying the scaled-down first visual content comprises changing a display location of the scaled-down first visual content in response to user input. In some embodiments, the changing of the display location comprises moving the scaled-down first visual content in a direction toward which the mobile computing device is tilted. In other embodiments, the changing of the display location includes toggling the between a plurality of predefined display locations.

In some embodiments, the method 400 further includes a step of prompting the user to specify a total size of the scaled-down first visual content before the step 410 of displaying the first visual content. In these embodiments, the step 420 of scaling down the first visual content is performed such that the scaled-down first visual content has the total size specified by the user.

It is understood that, unless otherwise specified, the steps 410-435 of the method 400 are not necessarily performed in numerical order. It is also understood that additional process steps may be performed before, during, or after the steps 410-435 in FIG. 21. For example, the method 400 may further include a step of powering on the screen. For reasons of simplicity, other additional steps are not discussed in detail herein.

Figure 22:
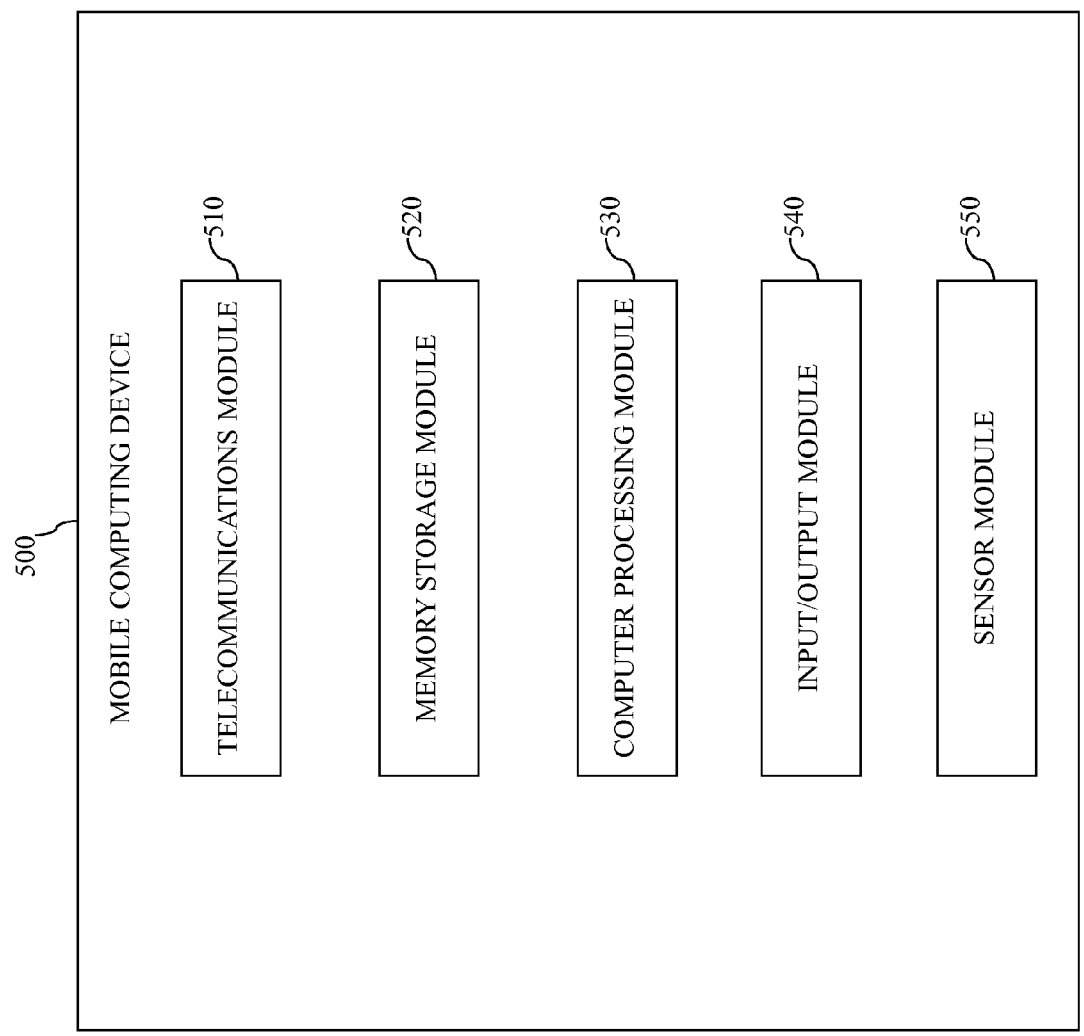
FIG. 22 is a simplified block diagram of an example mobile computing device for performing one or more of the processes discussed with reference to FIGS. 1-21 according to various aspects of the present disclosure.

FIG. 22 is a simplified block diagram of a mobile computing device 500 according to the various aspects of the present disclosure. The mobile computing device 500 may be implemented as an embodiment of the mobile computing device 100 discussed above.

The mobile computing device 500 includes a telecommunications module 510. The telecommunications module 510 contains various electronic circuitry components configured to conduct telecommunications with one or more external devices. The electronic circuitry components allow the telecommunications module 510 to conduct telecommunications in one or more of the wired or wireless telecommunications protocols, including communications protocols such as IEEE 802.11 (WiFi), IEEE 802.15 (Bluetooth), GSM, CDMA, LTE, WIMAX, DLNA, HDMI, etc. In some embodiments, the telecommunications module 510 includes antennas, filters, low-noise amplifiers, digital-to-analog (DAC) converters, analog-to-digital (ADC) converters, and transceivers. The transceivers may further include circuitry components such as mixers, amplifiers, oscillators, phase-locked loops (PLLs), and/or filters. Some of these electronic circuitry components may be integrated into a single discrete device or an integrated circuit (IC) chip.

The mobile computing device 500 may include a computer memory storage module 520. The memory storage module 520 may contain various forms of digital memory, such as hard disks, FLASH, SRAM, DRAM, ROM, EPROM, memory chips or cartridges, etc. Computer programming code or programming instructions may be permanently or temporarily stored in the memory storage module 520, for example. In some embodiments, the computer memory storage module 520 may include a cache memory where files can be temporarily stored. In certain embodiments, the computer memory storage module 520 may include non-volatile memory. In other embodiments, the computer memory storage module 520 may include a Secure Digital (SD) memory card slot or a microSD memory card slot. An SD memory card or a microSD memory card may or may not be present inside the slot.

The mobile computing device 500 may also include a computer processing module 530. The computer processing module 530 may contain one or more central processing units (CPUs), graphics processing units (GPUs), or digital signal processors (DSPs), which may each be implemented using various digital circuit blocks (including logic gates such as AND, OR, NAND, NOR, XOR gates, etc) along with certain software code. The computer processing module 530 may be used to execute the computer programming code stored in the memory storage module 520.

The mobile computing device 500 may also include an input/output module 540, which may serve as a communications interface for the mobile computing device 500. In some embodiments, the input/output module 540 may include one or more touch-sensitive screens, physical and/or virtual buttons (such as power and volume buttons) on or off the touch-sensitive screen, physical and/or virtual keyboards, mouse, track balls, speakers, microphones, light-sensors, light-emitting diodes (LEDs), communications ports (such as USB or HDMI ports), joy-sticks, image-capture devices (for example cameras), etc. In some embodiments, the touch-sensitive screen may be used to display visual content and scaled-down visual content discussed above. In alternative embodiments, a non-touch screen display may be implemented as a part of the input/output module 540.

The mobile computing device 500 also includes a sensor module 550. The sensor module 550 includes one or more of the sensors discussed above, for example proximity sensors, accelerometers, gyroscopes, pressure sensors, temperature sensors etc. As discussed above, these sensors may be used to detect various user interactions with the mobile computing device 500.

Figure 23:
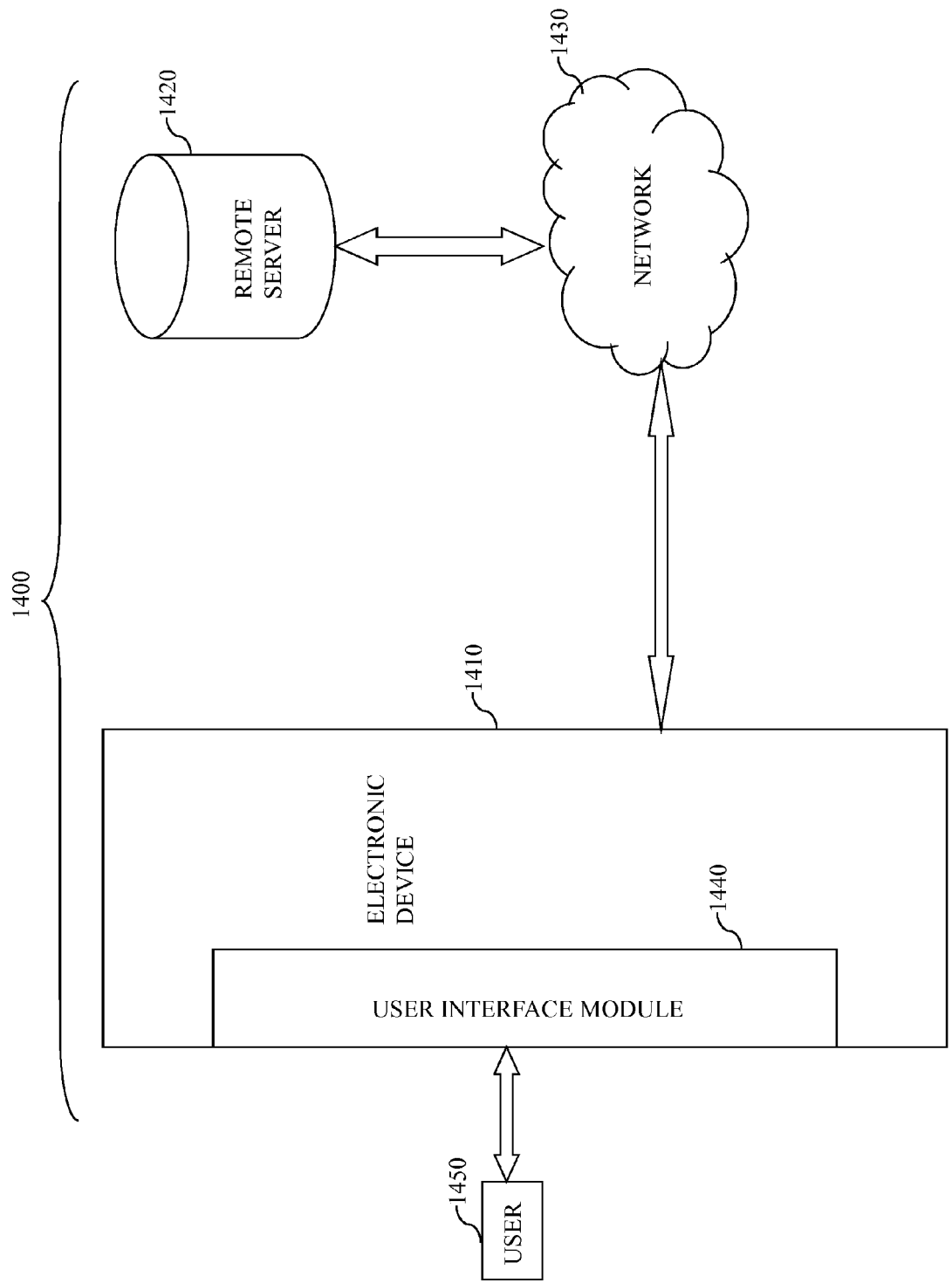
FIG. 23 is a simplified block diagram of an example system for performing one or more of the processes discussed with reference to FIGS. 1-22 according to various aspects of the present disclosure.

FIG. 23 is a simplified diagrammatic view of a system 1400 that may be used to perform certain aspects of the visual content scaling down process of the present disclosure discussed above. In some embodiments, the system 1400 may include an electronic device 1410. The electronic device 1410 may be implemented as an embodiment of the mobile computing device 500 of FIG. 22. In some embodiments, the electronic device 1410 includes a tablet computer or a smart phone, or a laptop/table hybrid.

The system 1400 also includes a remote server 1420. The remote server 1420 may be implemented in a "cloud" computing environment and may include one or more databases that store files, for example the various files that can also be stored locally in the electronic device 1410 as discussed above.

The electronic device 1410 and the remote server 1420 may be communicatively coupled together through a network 1430. The network 1430 may include cellular towers, routers, switches, hubs, repeaters, storage units, cabling (such as fiber-optic cabling or telephone cabling), and other suitable devices. The network 1430 may be implemented using any of the suitable wired or wireless networking protocols. The electronic device 1410 and the remote server 1420 may also be able to communicate with other devices on the network 1430 and either carry out instructions received from the network, or send instructions through the network to these external devices to be carried out.

To facilitate user interaction with its offered services, a service provider (that hosts or operates the remote server 1420) may provide a user interface module 1440. The user interface module 1440 may include software programming code and may be installed on the electronic device 1410 (for example in a memory storage module). In some embodiments, the user interface module 440 may include a downloadable "app", for example an app that is downloadable through a suitable service such as APPLE's® ITUNES®, THE APP STORE® from APPLE®, ANDROID's® PLAY STORE®, AMAZON's® INSTANT VIDEO®, MICROSOFT's® WINDOWS STORE®, RESEARCH IN MOTION's® BLACKBERRY APP WORLD®, etc. In the embodiment shown, the user interface module 1440 includes an instance of the "app" that has been downloaded and installed on the electronic device 1410. The app may also be used to perform the various aspects of the present disclosure discussed above, such as with respect to face-unlock, voice-unlock, dynamically adjustable screen time out, customizable lock screen, and/or the contextually-aware volume controls discussed above.

A user 1450 may interact with the system 1400 by sending instructions to the electronic device 1410 through the user interface module 1440. For example, the user 1450 may be a subscriber of the services offered by the service provider running/hosting/operating the remote server 1420. The user 1450 may attempt to log in to the remote server 1420 by launching the "app" of the user interface 1440. The user's login credentials are electrically sent to the remote server 1420 through the network 1430. After verifying the user login credentials, the remote server 1420 may instruct the user interface module 1440 to display a suitable interface to interact with the user in a suitable manner.

One aspect of the present disclosure involves a mobile computing device. The mobile computing device includes: a screen configured to display visual content; a computer memory storage module configured to store executable computer programming code; and a computer processor module operatively coupled to the computer memory storage module. The computer processor module is configured to execute the computer programming code to perform the following steps: displaying a first visual content on the screen, wherein the first visual content occupies a substantial entirety of a viewable area of the screen; detecting, while the first visual content is being displayed, an action performed by a user to the mobile computing device; scaling down the first visual content in response to the detecting of the action performed by the user, wherein the scaled-down first visual content occupies a fraction of the viewable area of the screen, and wherein the fraction is within a predetermined range and is less than 1; displaying the scaled-down first visual content on the screen; detecting, via the screen of the mobile computing device, an interaction with the scaled-down first visual content from the user; and displaying, in response to the detecting of the interaction from the user, a second visual content on the screen of the mobile computing device, wherein the second visual content is different from the first visual content, and wherein the second visual content occupies a substantial entirety of the viewable area of the screen.

Another aspect of the present disclosure involves a method. The method includes: displaying a first visual content on a screen of a mobile computing device, wherein the first visual content occupies a substantial entirety of a viewable area of the screen; detecting, while the first visual content is being displayed, an action performed by a user to the mobile computing device; scaling down the first visual content in response to the detecting of the action performed by the user, wherein the scaled-down first visual content occupies a fraction of the viewable area of the screen, and wherein the fraction is within a predetermined range and is less than 1; displaying the scaled-down first visual content on the screen; detecting, via the screen of the mobile computing device, an interaction with the scaled-down first visual content from the user; and displaying, in response to the detecting of the interaction from the user, a second visual content on the screen of the mobile computing device, wherein the second visual content is different from the first visual content, and wherein the second visual content occupies a substantial entirety of the viewable area of the screen.

Yet another aspect of the present disclosure involves a method of facilitating one-handed operation of a mobile computing device that has one or more physical navigation buttons. The method includes: displaying a first visual content on a screen of the mobile computing device, wherein the first visual content occupies a substantial entirety of a viewable area of the screen, wherein the screen is a touch-sensitive screen, and wherein the first visual content is free of any virtual navigation buttons; detecting, while the first visual content is being displayed, an action performed by a user to the mobile computing device, wherein the first visual content comprises: a home screen, a lock screen, a web page, a video, a picture, an electronic book, an application, an electronic game, or an electronic document; scaling down the first visual content in response to the detecting of the action performed by the user, wherein the scaled-down first visual content occupies a fraction of the viewable area of the screen, and wherein the scaled-down visual content has a total size that is predefined by the user; displaying the scaled-down first visual content on the screen, wherein the displaying the scaled-down first visual content comprises: appending one or more virtual navigation buttons to the scaled-down first visual content, the one or more virtual navigation buttons emulating the one or more physical navigation buttons; and changing a display location of the scaled-down first visual content in response to user input; detecting, via the screen of the mobile computing device, an interaction with the scaled-down first visual content from the user; and displaying, in response to the detecting of the interaction from the user, a second visual content on the screen of the mobile computing device, wherein the second visual content is different from the first visual content, and wherein the second visual content occupies a substantial entirety of the viewable area of the screen.

It should be appreciated that like reference numerals in the present disclosure are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A mobile computing device, comprising:
   a screen configured to display visual content;
   a computer memory storage module configured to store executable computer programming code; and
   a computer processing module operatively coupled to the computer memory storage module, wherein the computer processor module is configured to execute the computer programming code to perform the following steps:
      displaying a first visual content on the screen, wherein the first visual content occupies an entirety of a viewable area of the screen;
      detecting, while the first visual content is being displayed, an action performed by a user to the mobile computing device;
      scaling down the first visual content in response to the detecting of the action performed by the user, wherein the scaled-down first visual content occupies less than the entirety of the viewable area of the screen;
      displaying the scaled-down first visual content on the screen;
      detecting, via the screen of the mobile computing device, an interaction with the scaled-down first visual content from the user; and
      displaying, in response to the detecting of the interaction from the user, a second visual content on the screen of the mobile computing device, wherein the second visual content is different from the first visual content, and wherein the second visual content occupies the entirety of the viewable area of the screen;
   wherein the detecting the action comprising at least one of the following:
      the mobile computing device includes one or more motion sensors, and the detecting of the action comprises detecting, via the one or more motion sensors, a rapid physical movement of the mobile computing device;
      the mobile computing device includes one or more pressure sensors, and the detecting of the action comprises detecting, via the one or more pressure sensors, a squeezing force applied by the user to the mobile computing device;
      the mobile computing device includes a first mechanism and a second mechanism for increasing and decreasing a volume output of the mobile computing device, respectively, and the detecting of the action comprises detecting a simultaneous pressing of the first and second mechanisms;
      the detecting of the action comprises detecting a plurality of quick taps on the screen in succession; or
      the detecting of the action comprises detecting a voice command from the user;
   wherein:
   the mobile computing device includes more than one physical navigation buttons, where the physical navigation buttons comprise a back button and a home button, the back button and the home button performing different tasks when pressed;
   the physical navigation buttons are emulated by more than one virtual navigation buttons;
   the displaying of the first visual content comprises displaying none of the more than one virtual navigation buttons; and
   the displaying of the scaled-down first visual content comprises appending the more than one virtual navigation buttons to the scaled-down first visual content.

2. The mobile computing device of claim 1, wherein the first visual content comprises: a home screen, a lock screen, a web page, a video, a picture, an electronic book, an application, an electronic game, or an electronic document.

3. The mobile computing device of claim 1, wherein the detecting the action further comprises at least one of the following:
   the mobile computing device includes a dedicated physical button for scaling down visual content displayed on the screen, and the detecting of the action comprises detecting a pressing of the dedicated physical button; and
   the mobile computing device includes a plurality of proximity sensors, and the detecting of the action comprises detecting, via at least one of the plurality of proximity sensors, an attempt of the user to reach a corner region or an edge region of the screen with a thumb.

4. The mobile computing device of claim 1, wherein the steps further comprise: detecting a position of a thumb of the user relative to the screen;
   wherein the scaling down of the first visual content comprises displaying the scaled-down first visual content in a region of the screen proximate to the thumb of the user.

5. The mobile computing device of claim 1, wherein the steps further comprise: determining whether the user is holding the mobile computing device with a left hand or with a right hand;
   wherein the scaling down of the first visual content comprises displaying the scaled-down first visual content in a region of the screen near a left edge when it has been determined that the user is holding the mobile computing device with the left hand; and wherein the scaling down of the first visual content comprises displaying the scaled-down first visual content in another region of the screen near a right edge when it has been determined that the user is holding the mobile computing device with the right hand.

6. The mobile computing device of claim 1, wherein the displaying of the scaled-down first visual content comprises changing a display location of the scaled-down first visual content in response to user input.

7. The mobile computing device of claim 6, wherein the changing of the display location comprises moving the scaled-down first visual content in a direction toward which the mobile computing device is tilted.

8. The mobile computing device of claim 1, wherein the steps further comprise: before the displaying of the first visual content, prompting the user to specify a total size of the scaled-down first visual content;

wherein the scaling down of the first visual content is performed such that the scaled-down first visual content has the total size specified by the user.

9. The mobile computing device of claim 1, wherein the detecting the action comprising at least one of the following:

detecting, via the one or more motion sensors, the rapid physical movement of the mobile computing device;

detecting, via the one or more pressure sensors, the squeezing force applied by the user to the mobile computing device; and detecting the simultaneous pressing of the first and second mechanisms.

10. A method, comprising:

displaying a first visual content on a screen of a mobile computing device, wherein the first visual content occupies an entirety of a viewable area of the screen;

detecting, while the first visual content is being displayed, an action performed by a user to the mobile computing device;

scaling down the first visual content in response to the detecting of the action performed by the user, wherein the scaled-down first visual content occupies a fraction of the viewable area of the screen, and wherein the fraction is within a predetermined range and is less than 1;

displaying the scaled-down first visual content on the screen;

detecting, via the screen of the mobile computing device, an interaction with the scaled-down first visual content from the user; and displaying, in response to the detecting of the interaction from the user, a second visual content on the screen of the mobile computing device, wherein the second visual content is different from the first visual content, and wherein the second visual content occupies the entirety of the viewable area of the screen;

wherein the detecting the action comprising at least one of the following:

the mobile computing device includes one or more motion sensors, and the detecting of the action comprises detecting, via the one or more motion sensors, a rapid physical movement of the mobile computing device;

the mobile computing device includes one or more pressure sensors, and the detecting of the action comprises detecting, via the one or more pressure sensors, a squeezing force applied by the user to the mobile computing device;

the mobile computing device includes a first mechanism and a second mechanism for increasing and decreasing a volume output of the mobile computing device, respectively, and the detecting of the action comprises detecting a simultaneous pressing of the first and second mechanisms;

the detecting of the action comprises detecting a plurality of quick taps on the screen in succession; and the detecting of the action comprises detecting a voice command from the user;

wherein:

the mobile computing device includes more than one physical navigation buttons, where the physical navigation buttons comprise a back button and a home button, the back button and the home button performing different tasks when pressed;

the physical navigation buttons are emulated by more than one virtual navigation buttons;

the displaying of the first visual content comprises displaying none of the more than one virtual navigation buttons; and the displaying of the scaled-down first visual content comprises appending the more than one virtual navigation buttons to the scaled-down first visual content.

11. The method of claim 10, wherein the first visual content comprises: a home screen, a lock screen, a web page, a video, a picture, an electronic book, an application, an electronic game, or an electronic document.

12. The method of claim 10, further comprising: detecting a position of a thumb of the user relative to the screen;

wherein the scaling down of the first visual content comprises displaying the scaled-down first visual content in a region of the screen proximate to the thumb of the user.

13. The method of claim 10, further comprising: determining whether the user is holding the mobile computing device with a left hand or with a right hand;

wherein the scaling down of the first visual content comprises displaying the scaled-down first visual content in a region of the screen near a left edge when it has been determined that the user is holding the mobile computing device with the left hand; and wherein the scaling down of the first visual content comprises displaying the scaled-down first visual content in another region of the screen near a right edge when it has been determined that the user is holding the mobile computing device with the right hand.

14. The method of claim 10, wherein the displaying of the scaled-down first visual content comprises changing a display location of the scaled-down first visual content in response to user input.

15. The method of claim 14, wherein the changing of the display location comprises moving the scaled-down first visual content in a direction toward which the mobile computing device is tilted.

16. The method of claim 10, further comprising: before the displaying of the first visual content, prompting the user to specify a total size of the scaled-down first visual content;

wherein the scaling down of the first visual content is performed such that the scaled-down first visual content has the total size specified by the user.

17. A method of facilitating one-handed operation of a mobile computing device that has more than one physical navigation buttons, comprising:

displaying a first visual content on a screen of the mobile computing device, wherein the first visual content occupies an entirety of a viewable area of the screen, wherein the screen is a touch-sensitive screen, and wherein the first visual content is free of any virtual navigation buttons, the virtual navigation buttons including at least two of: a back button, a home button, and a menu button;

detecting, while the first visual content is being displayed, an action performed by a user to the mobile computing device, wherein the first visual content comprises: a home screen, a lock screen, a web page, a video, a picture, an electronic book, an application, an electronic game, or an electronic document;

scaling down the first visual content in response to the detecting of the action performed by the user, wherein the scaled-down first visual content occupies less than the entirety of the viewable area of the screen, and wherein the scaled-down visual content has a total size that is predefined by the user;

displaying the scaled-down first visual content on the screen, wherein the displaying the scaled-down first visual content comprises:
  appending the virtual navigation buttons to the scaled-down first visual content, the virtual navigation buttons emulating the more than one physical navigation buttons; and
  changing a display location of the scaled-down first visual content in response to user input;

detecting, via the screen of the mobile computing device, an interaction with the scaled-down first visual content from the user; and displaying, in response to the detecting of the interaction from the user, a second visual content on the screen of the mobile computing device, wherein the second visual content is different from the first visual content, and wherein the second visual content occupies the entirety of the viewable area of the screen;

wherein the detecting the action comprising at least one of the following:
  the mobile computing device includes one or more motion sensors, and the detecting of the action comprises detecting, via the one or more motion sensors, a rapid physical movement of the mobile computing device;
  the mobile computing device includes one or more pressure sensors, and the detecting of the action comprises detecting, via the one or more pressure sensors, a squeezing force applied by the user to the mobile computing device;
  the mobile computing device includes a first mechanism and a second mechanism for increasing and decreasing a volume output of the mobile computing device, respectively, and the detecting of the action comprises detecting a simultaneous pressing of the first and second mechanisms;
  the detecting of the action comprises detecting a plurality of quick taps on the screen in succession; and
  the detecting of the action comprises detecting a voice command from the user.

18. The method of claim 17, wherein at least one of the following is true:
  the mobile computing device includes a dedicated physical button for scaling down visual content displayed on the screen, and the detecting of the action comprises detecting a pressing of the dedicated physical button; and
  the mobile computing device includes a plurality of proximity sensors, and the detecting of the action comprises detecting, via at least one of the plurality of proximity sensors, an attempt of the user to reach a corner region or an edge region of the screen with a thumb.

19. The method of claim 17, further comprising: detecting a position of a thumb of the user relative to the screen;
  wherein the scaling down of the first visual content comprises displaying the scaled-down first visual content in a region of the screen proximate to the thumb of the user.

20. The method of claim 17, wherein the displaying of the scaled-down first visual content comprises changing a display location of the scaled-down first visual content in response to user input.

* * * * *